(12) United States Patent
Christensen

(10) Patent No.: US 6,703,722 B2
(45) Date of Patent: Mar. 9, 2004

(54) RECONFIGURABLE PLURAL DC POWER SOURCE POWER SYSTEM RESPONSIVE TO CHANGES IN THE LOAD OR THE PLURAL DC POWER SOURCES

(75) Inventor: Peter C. Christensen, Spokane, WA (US)

(73) Assignee: Avista Laboratories, Inc., Spokane, WA (US)

( * ) Notice: Subject to any disclaimer, the term of this patent is extended or adjusted under 35 U.S.C. 154(b) by 49 days.

(21) Appl. No.: 10/017,887

(22) Filed: Dec. 14, 2001

(65) Prior Publication Data
US 2003/0111908 A1 Jun. 19, 2003

(51) Int. Cl.$^7$ .................................................. H02J 1/00
(52) U.S. Cl. ............................. 307/71; 307/74; 307/86
(58) Field of Search ............................. 307/71, 72, 74, 307/75, 80, 85, 86

(56) References Cited

U.S. PATENT DOCUMENTS

| | | | |
|---|---|---|---|
| 3,160,528 A | 12/1964 | Dengler et al. ................ | 136/86 |
| 3,808,534 A | 4/1974 | Summers et al. ........... | 340/249 |
| 3,823,358 A | 7/1974 | Rey .............................. | 320/3 |
| 4,548,875 A | 10/1985 | Lance et al. .................. | 429/26 |
| 4,578,324 A | 3/1986 | Koehler et al. ............... | 429/26 |
| 4,670,702 A | 6/1987 | Yamada et al. ............... | 320/21 |
| 4,820,594 A | 4/1989 | Sugita et al. ................. | 429/17 |
| 5,006,846 A | 4/1991 | Granville et al. ......... | 34/870.28 |
| 5,154,986 A | 10/1992 | Takechi et al. ............... | 429/23 |
| 5,270,127 A | 12/1993 | Koga et al. ................... | 429/17 |

(List continued on next page.)

FOREIGN PATENT DOCUMENTS

| | | | | |
|---|---|---|---|---|
| GB | 2 129 237 | 10/1982 | ............ | H02H/9/04 |
| WO | WO 00/74165 A1 | 12/2000 | ............ | H01M/8/24 |

OTHER PUBLICATIONS

"Stationery Power Units: EPAC 500 W AC", http://www.h-power.com, HPower Corp., pg. Products, date printed Sep. 26, 2001.

"Stationary Power Units", http://www.hpower.com, HPower Corp., pg. Products, date printed Sep. 26, 2001.

"H–Power Corporation—Fuel Cell Stacks and Hydrogen Technology", http://www.hpower.com, HPower Corp., pg. Products , date printed Sep. 26, 2001.

"PEM Fuel Cells", http://www.hpower.com, HPower Corp., pg. Products, date printed Sep. 26, 2001.

"Portable/Mobile Power Units", http://www.hpower.com, HPower Corp., pg. Products, date printed Sep. 26, 2001.

"Portable/Mobile Power Units: Power PEM–PS250 250 WDC", http://www.hpower.com, HPower Corp., pg. Products, date printed Sep. 26, 2001.

"Portable/Mobile Power Units: Power PEM–PS500 500 WDC", http://www.hpower.com, HPower Corp., pg. Products, date printed Sep. 26, 2001.

U.S. patent application Ser. No. 09/864,526, Fuglevand et al., filed May 23, 2001.

U.S. patent application Ser. No. 09/577,407, Fuglevand et al., filed May 17, 2000.

*Primary Examiner*—Jeffrey Sterrett
(74) *Attorney, Agent, or Firm*—Wells St. John P.S.

(57) ABSTRACT

A power system for supplying a power requirement of a load is described and which includes a plurality of DC power sources having at least one fuel cell, and which provides power to a load; and a control electronics assembly is provided and which is electrically coupled to the respective DC power sources, and which selectively reconfigures the plurality of DC power sources to substantially serve the changing power requirements of the load.

6 Claims, 18 Drawing Sheets

U.S. PATENT DOCUMENTS

| | | | | |
|---|---|---|---|---|
| 5,298,341 A | 3/1994 | Khandkar et al. | | 429/32 |
| 5,387,477 A | 2/1995 | Cheiky | | 429/26 |
| 5,403,679 A | 4/1995 | Stone | | 429/99 |
| 5,532,072 A | 7/1996 | Spaeh et al. | | 429/34 |
| 5,534,362 A | 7/1996 | Okamoto et al. | | 429/32 |
| 5,543,240 A | 8/1996 | Lee et al. | | 429/38 |
| 5,571,630 A | 11/1996 | Cheiky | | 429/26 |
| 5,624,768 A | 4/1997 | Tanokura | | 429/23 |
| 5,763,113 A | 6/1998 | Meltser et al. | | 429/13 |
| 5,771,476 A | 6/1998 | Mufford et al. | | 701/22 |
| 5,914,542 A | * 6/1999 | Weimer et al. | | 307/85 |
| 5,927,416 A | 7/1999 | del Re et al. | | 180/65.2 |
| 5,929,538 A | 7/1999 | O'Sullivan et al. | | 307/66 |
| 5,932,365 A | 8/1999 | Lin et al. | | 429/12 |
| 5,945,232 A | 8/1999 | Ernst et al. | | 429/32 |
| 5,964,309 A | 10/1999 | Kimura et al. | | 180/65.8 |
| 5,989,739 A | 11/1999 | Zur Megede et al. | | 429/13 |
| 5,991,670 A | 11/1999 | Mufford et al. | | 429/19 |
| 5,998,053 A | 12/1999 | Diethelm | | 429/14 |
| 6,030,718 A | 2/2000 | Fuglevand et al. | | 429/26 |
| 6,051,192 A | 4/2000 | Maston et al. | | 429/23 |
| 6,096,449 A | 8/2000 | Fuglevand et al. | | 429/13 |
| 6,103,410 A | 8/2000 | Fuller et al. | | 429/13 |
| 6,110,612 A | 8/2000 | Walsh | | 429/13 |
| 6,127,058 A | 10/2000 | Pratt et al. | | 429/39 |
| 6,140,820 A | 10/2000 | James | | 324/434 |
| 6,251,534 B1 | 6/2001 | McElroy | | 429/38 |
| 6,268,666 B1 | * 7/2001 | Bhowmik | | 307/72 |
| 6,313,750 B1 | 11/2001 | Lacy | | 340/636 |
| 6,465,910 B2 | * 10/2002 | Young et al. | | 307/80 |
| 6,492,745 B1 | * 12/2002 | Colley et al. | | 307/85 |
| 6,498,462 B2 | * 12/2002 | Ballantine et al. | | 307/85 |

* cited by examiner

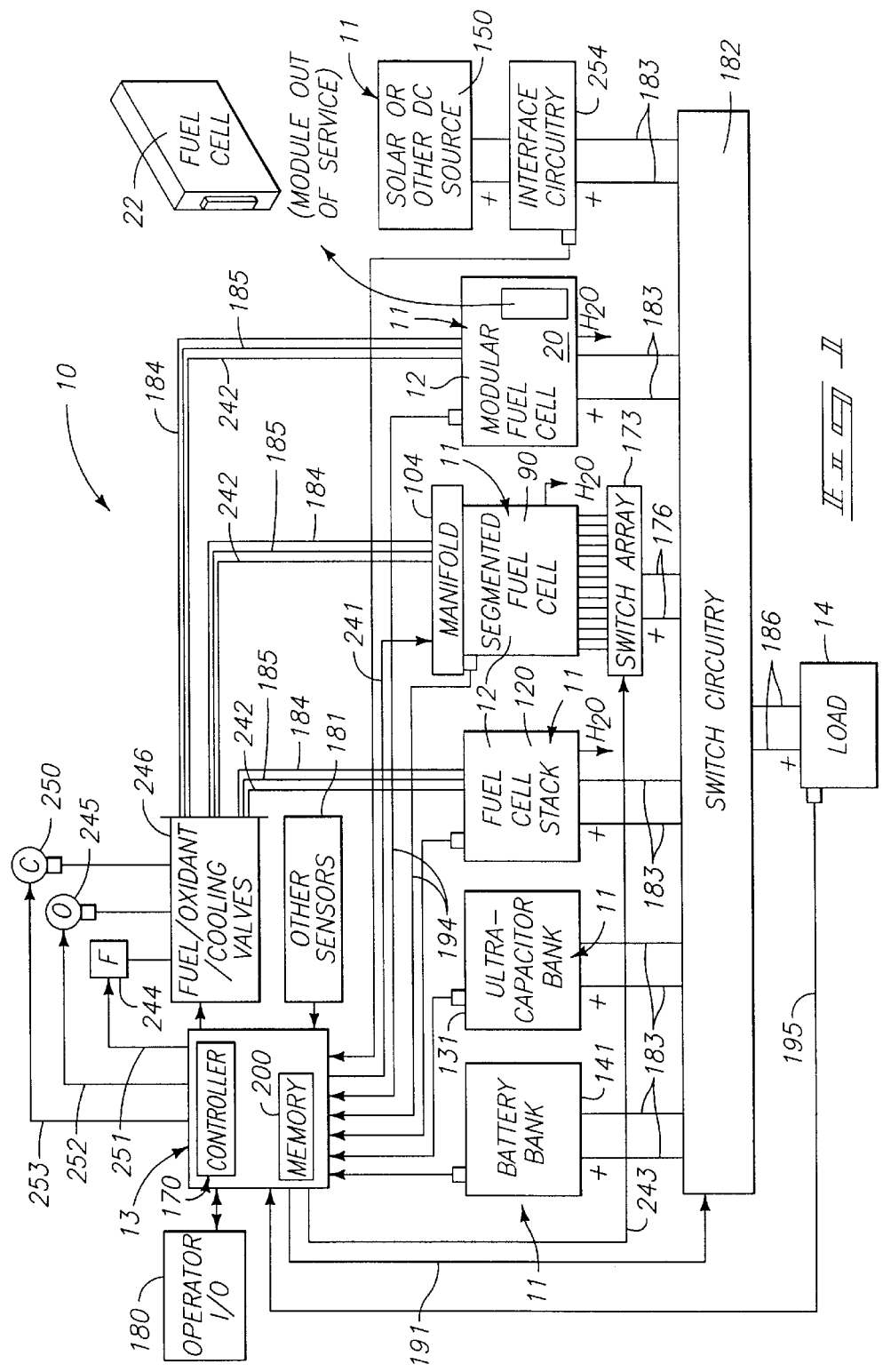

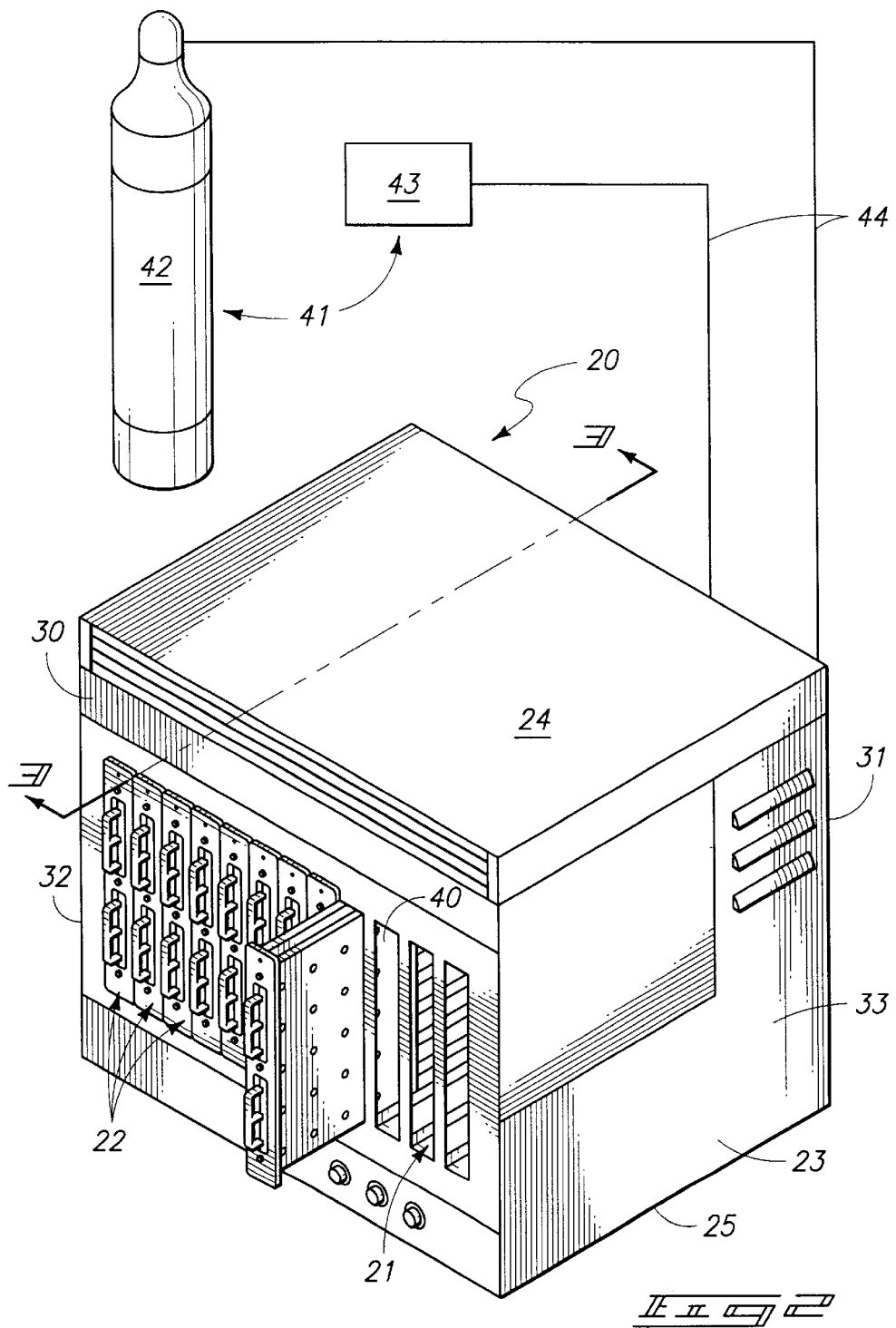

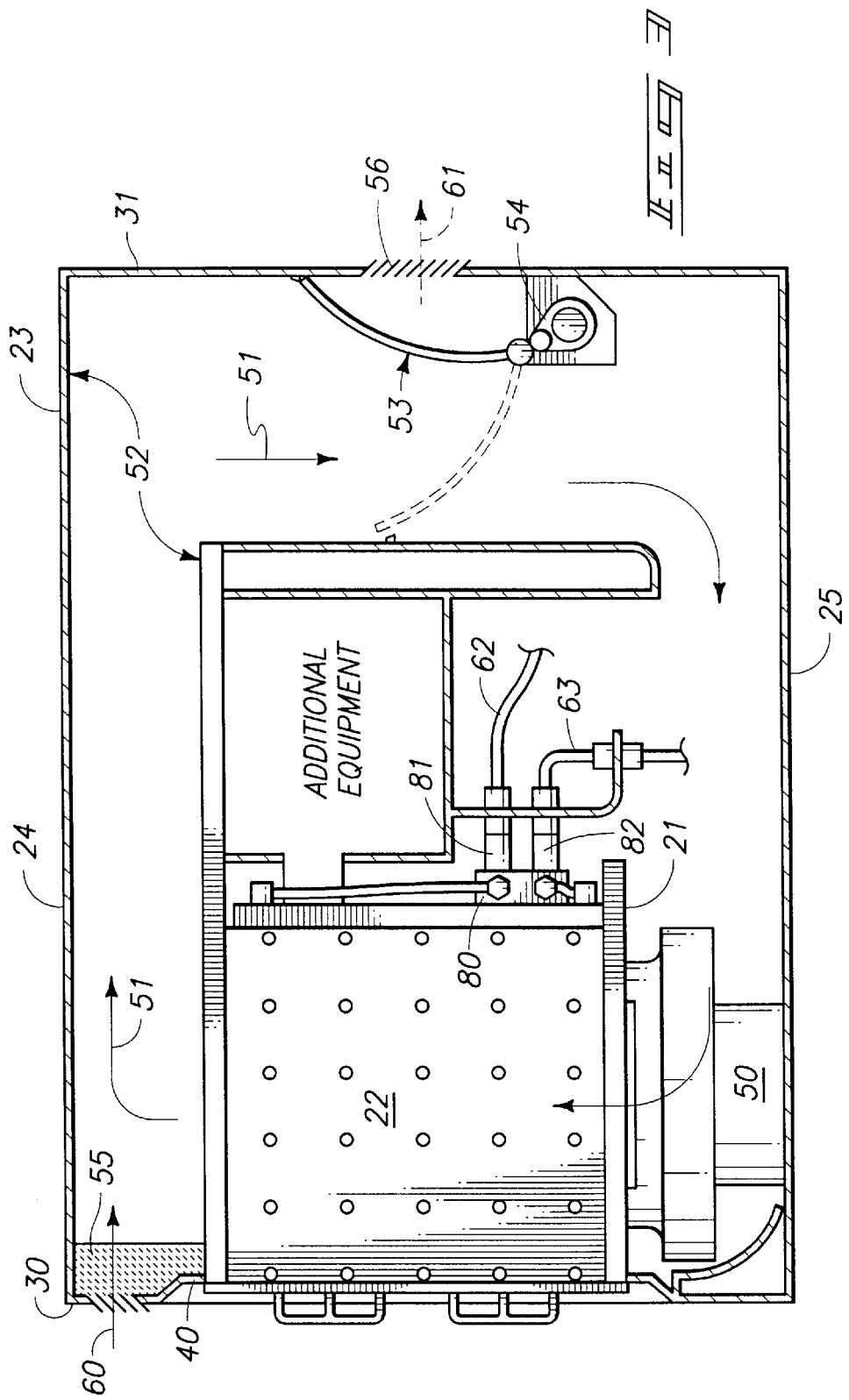

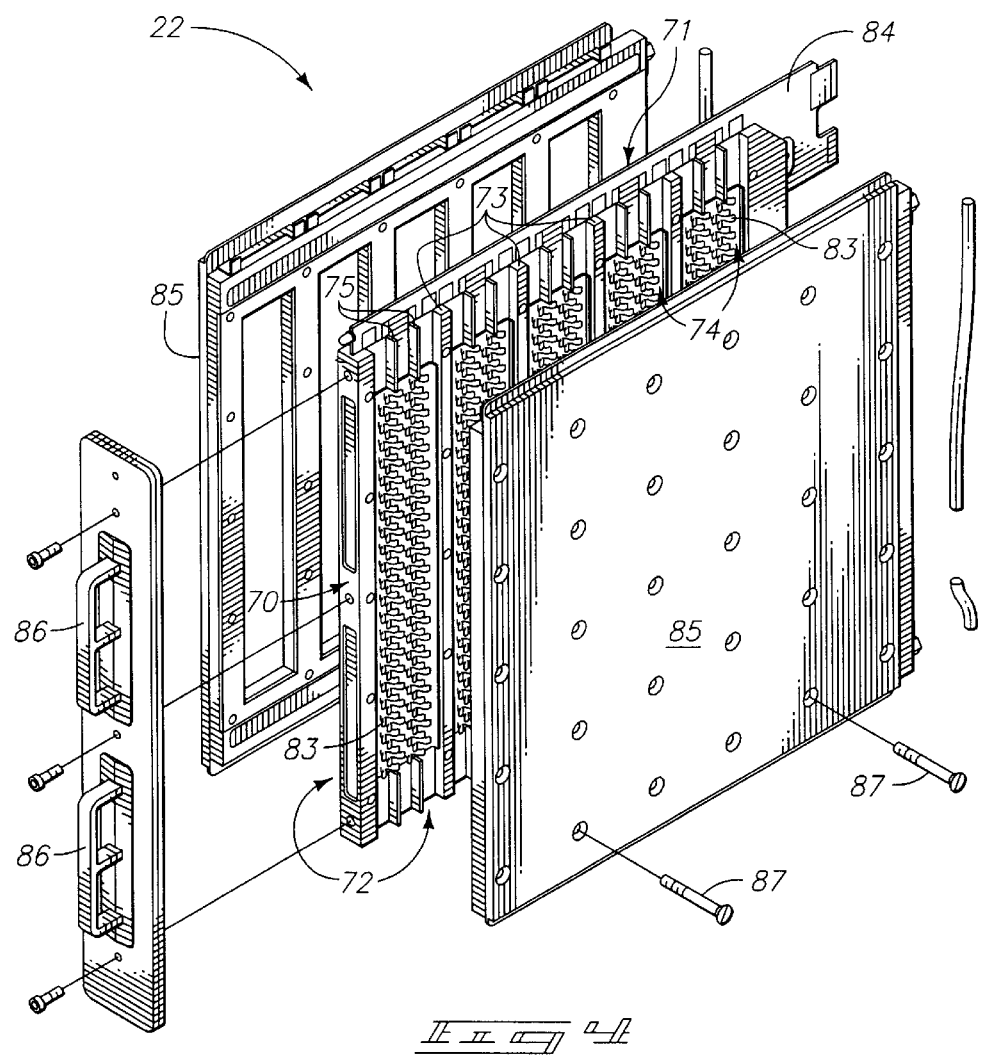

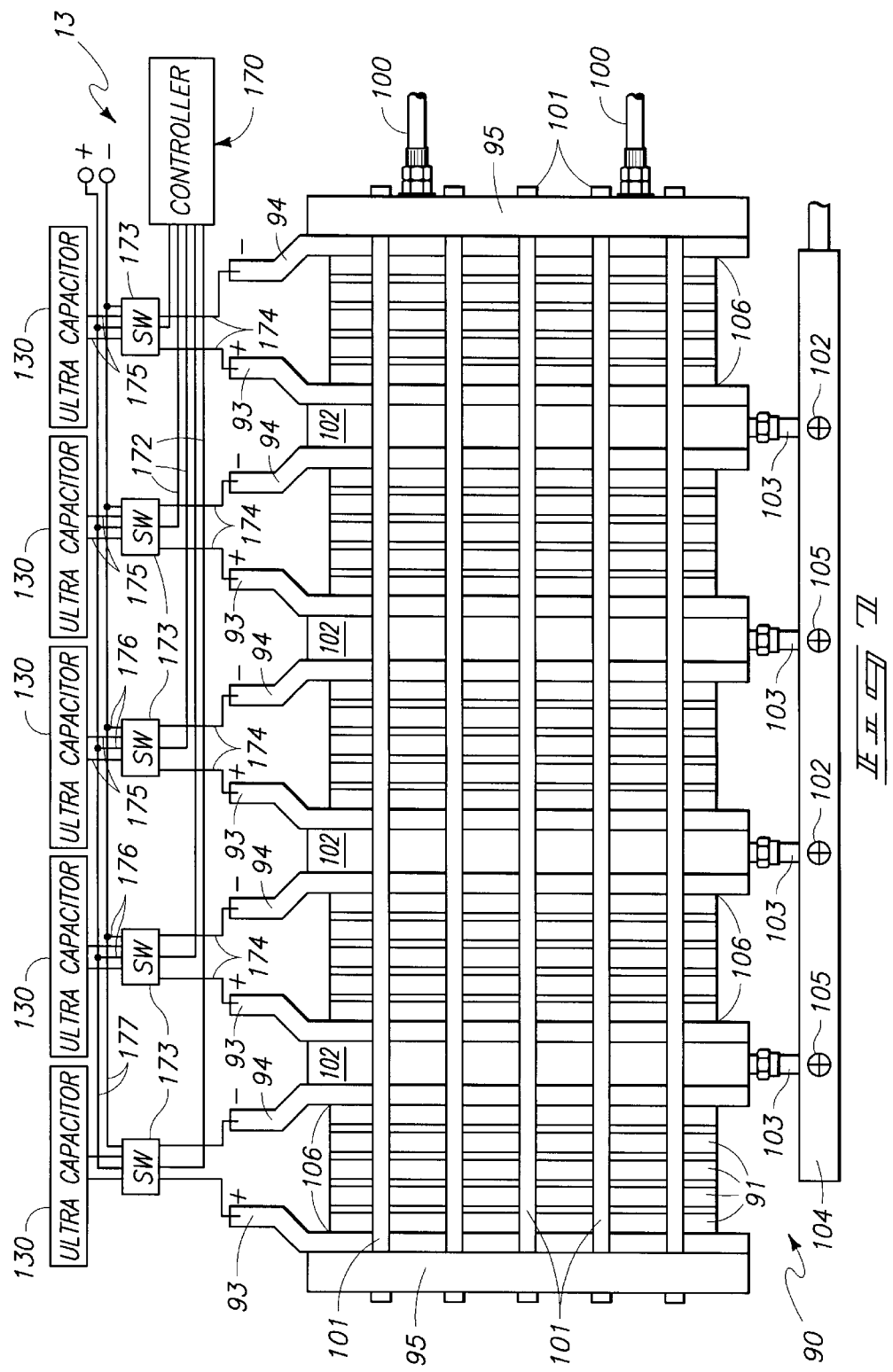

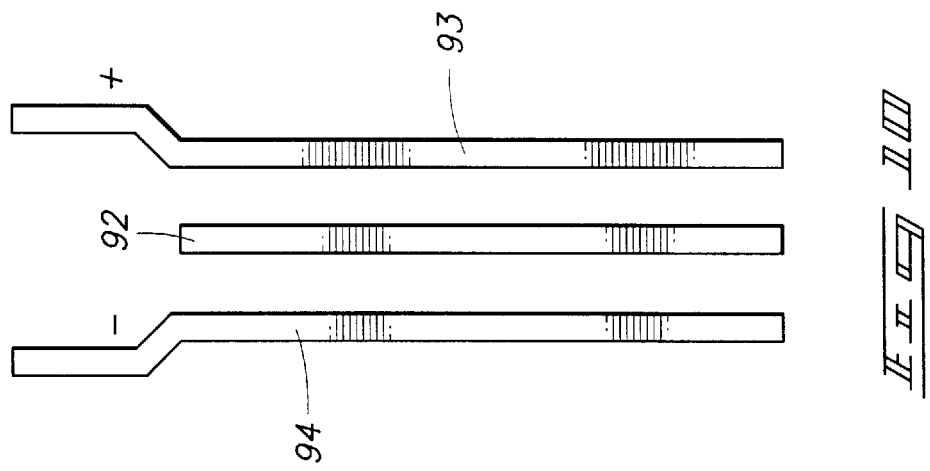
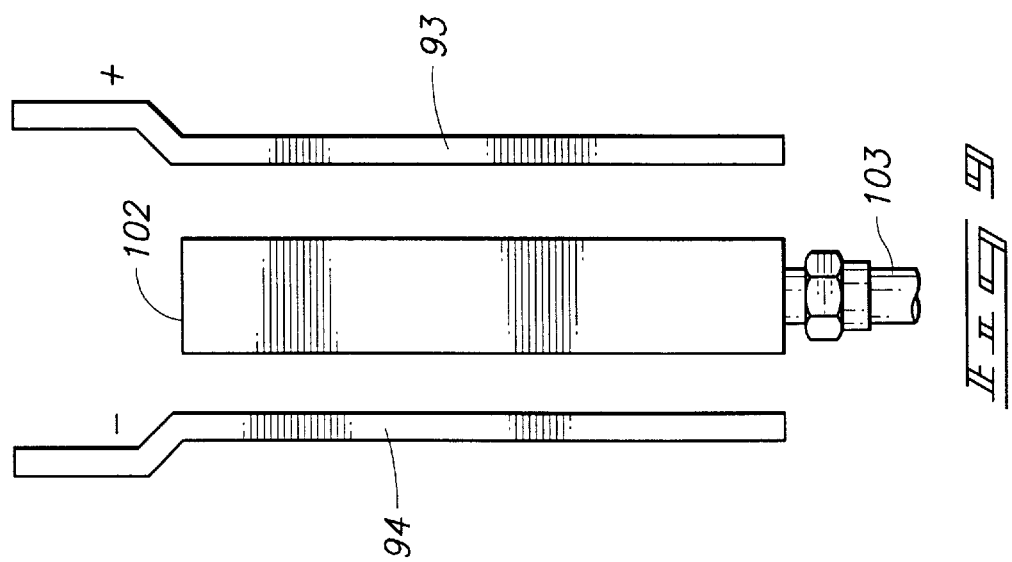

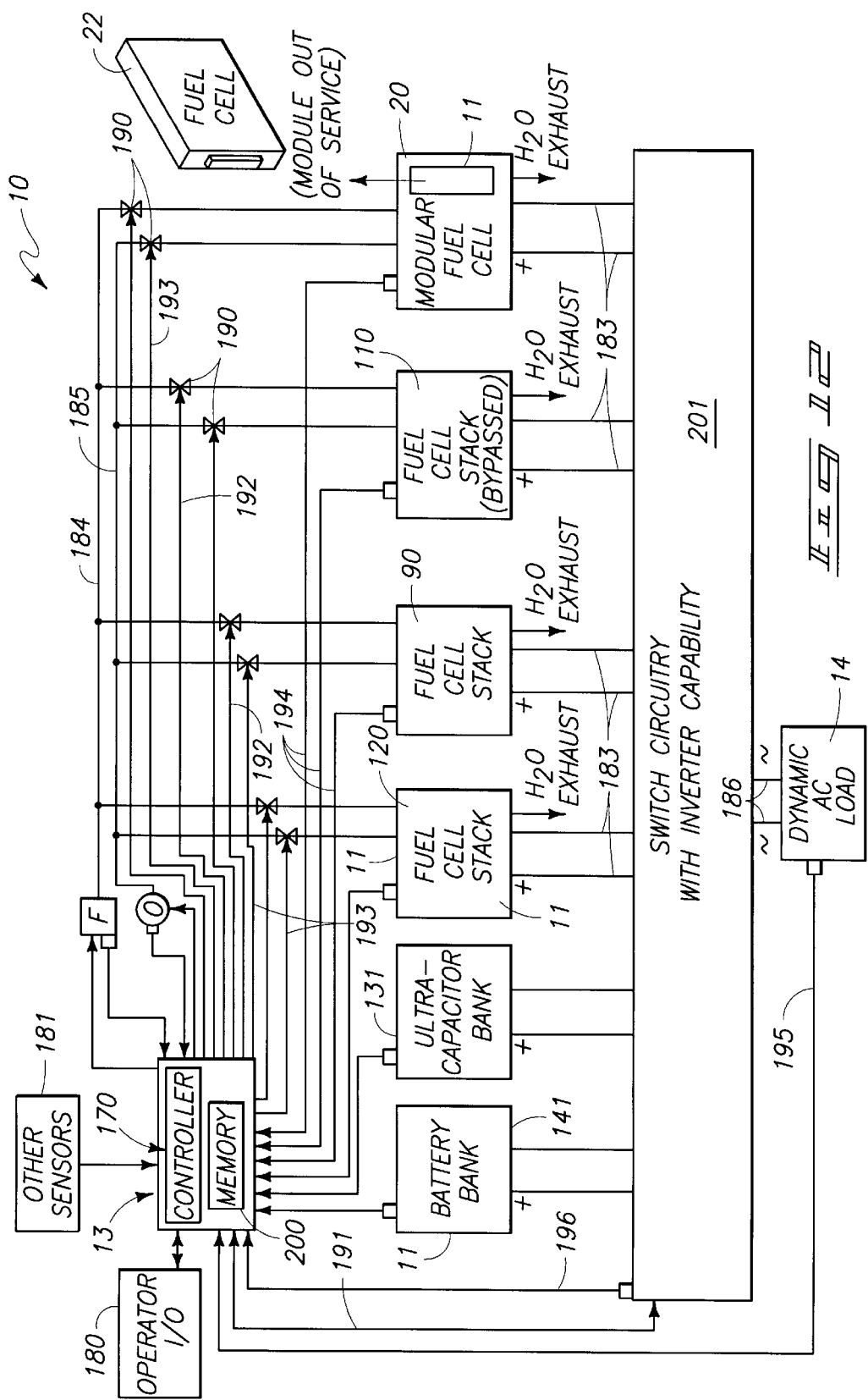

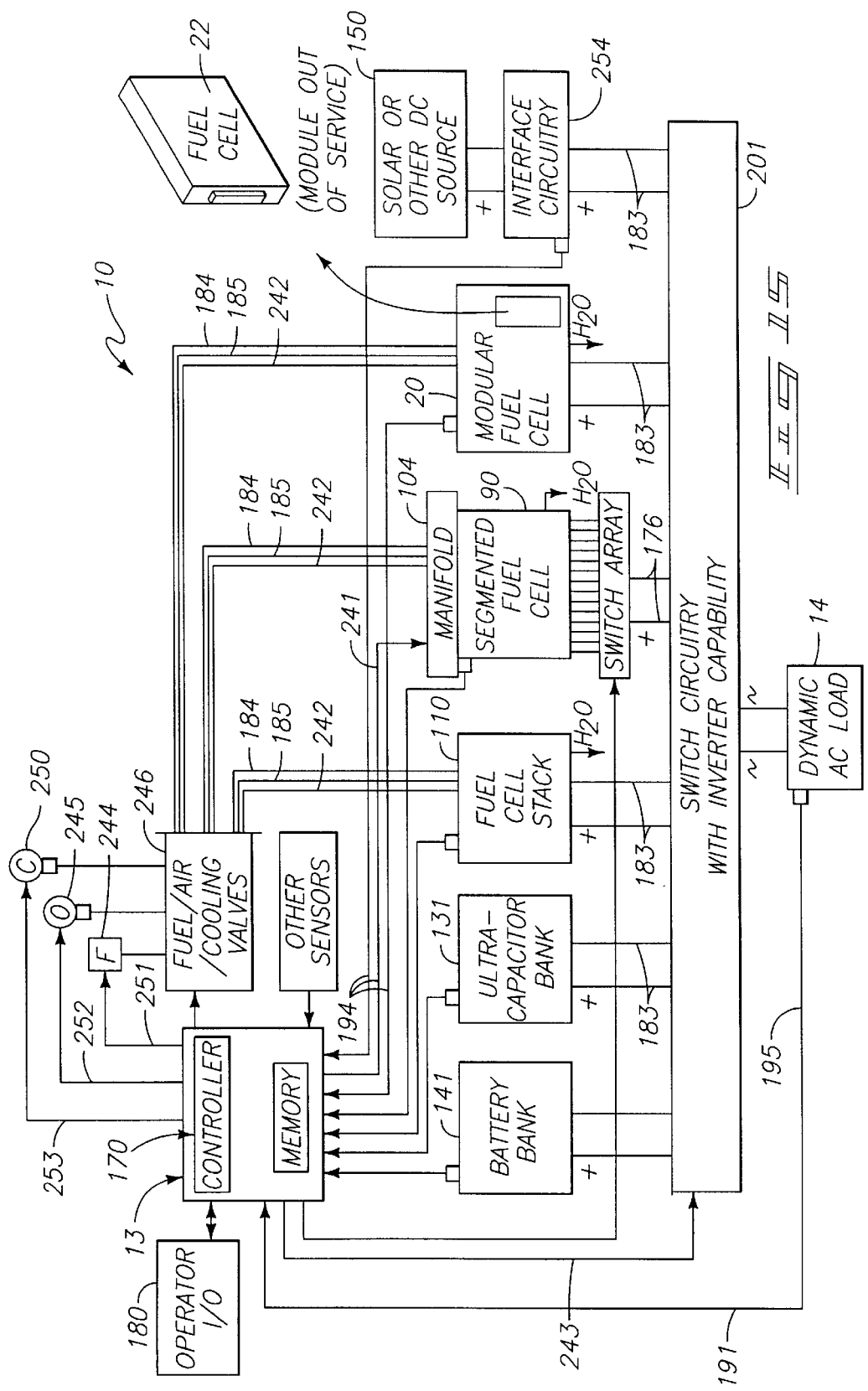

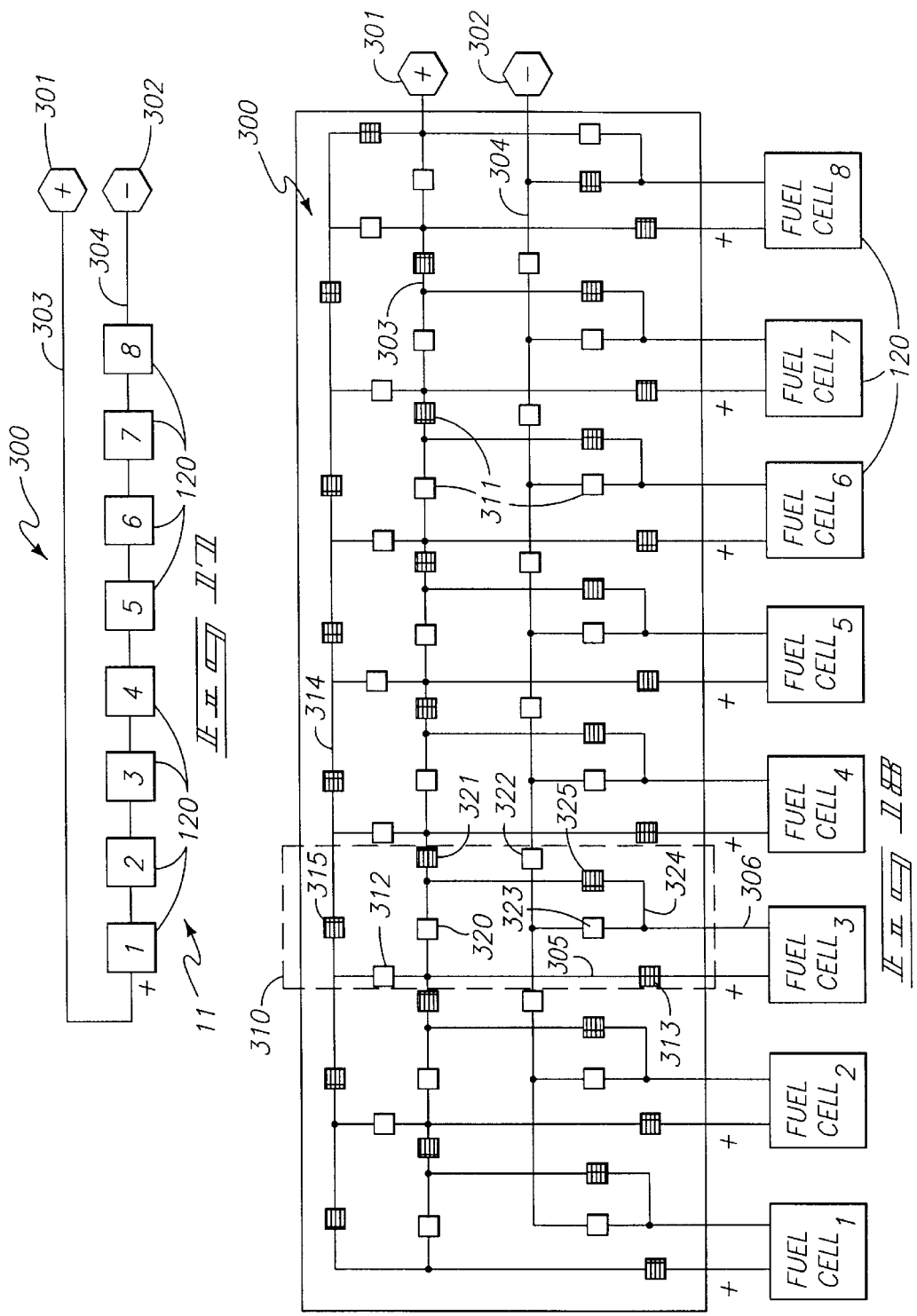

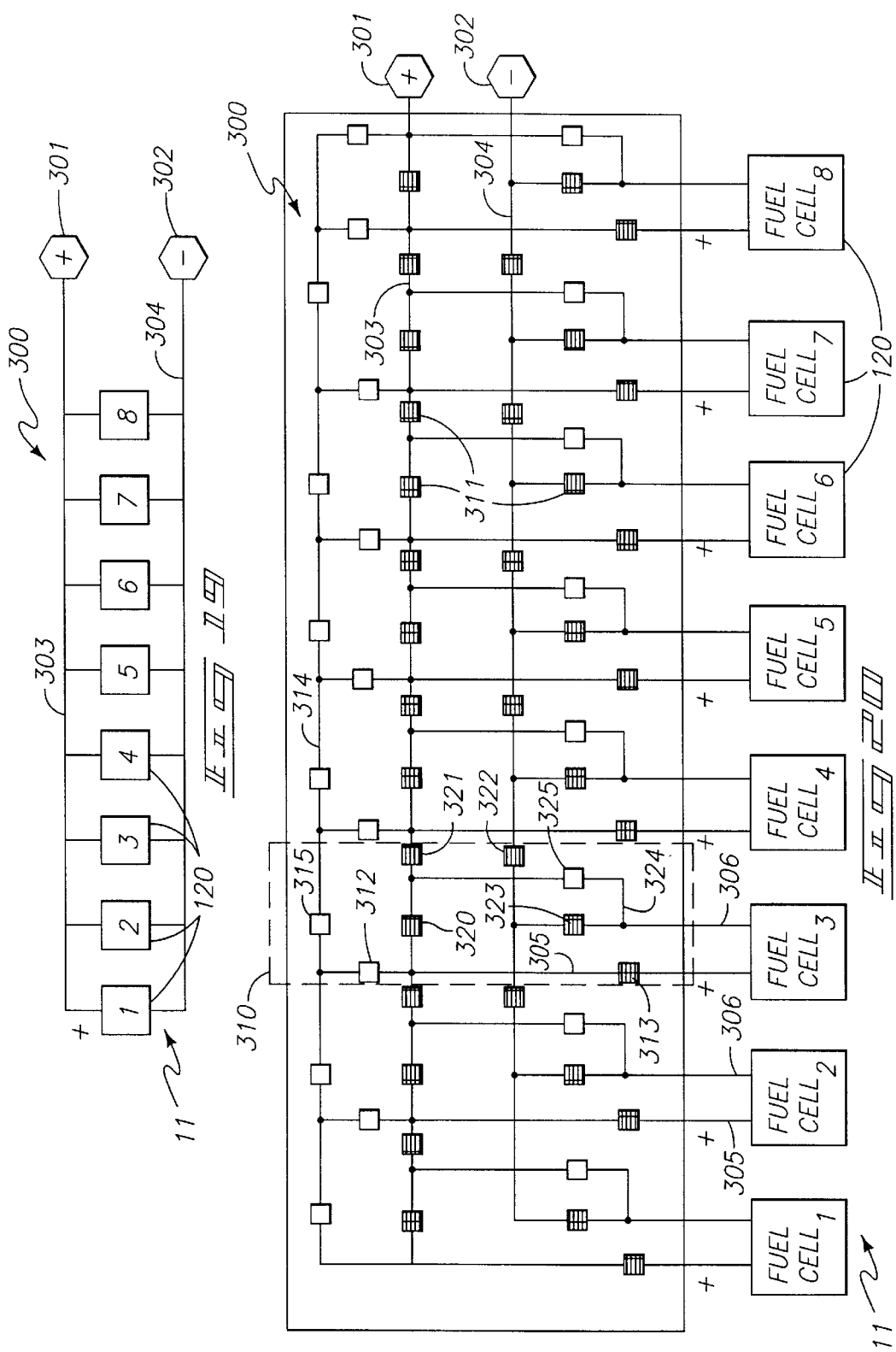

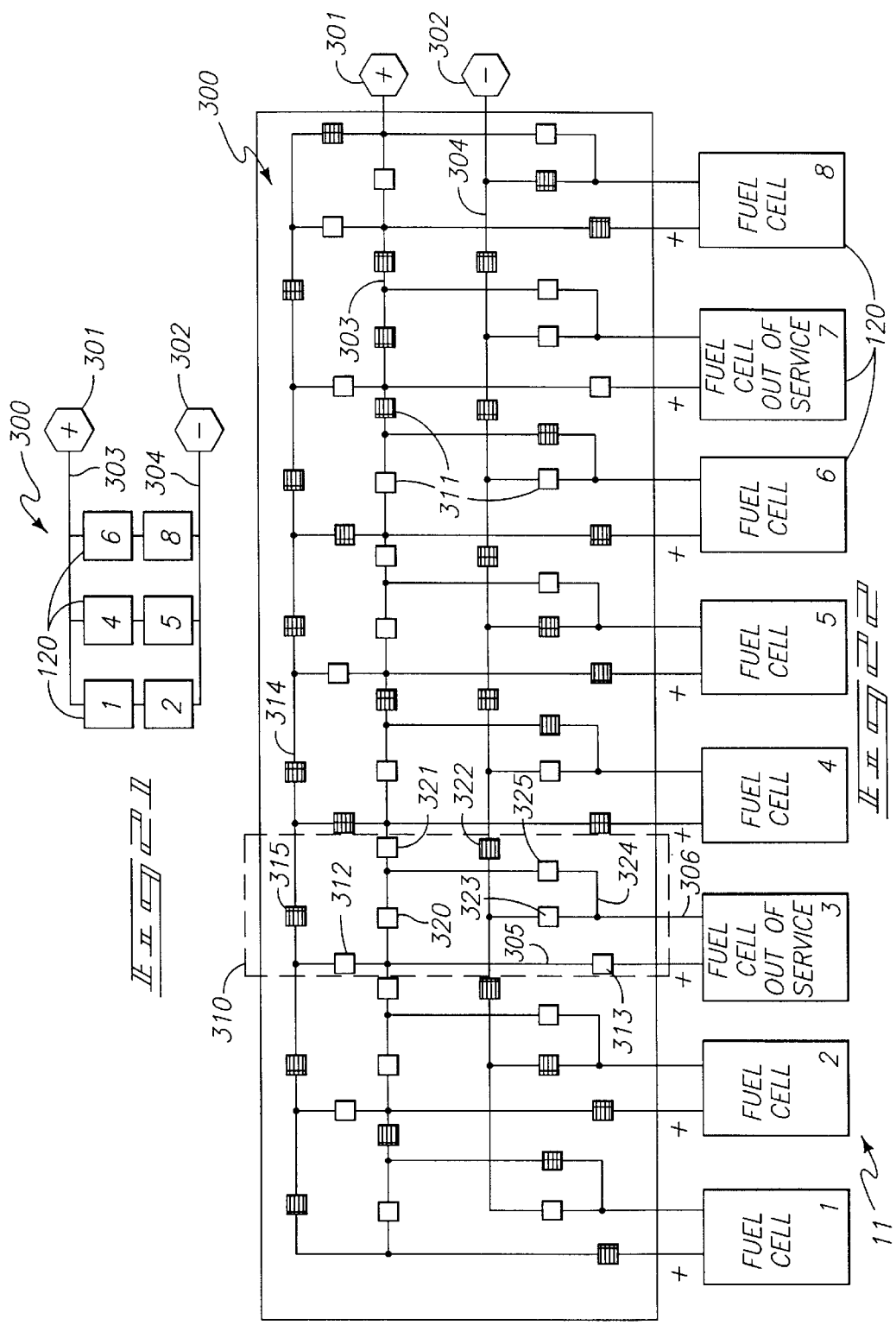

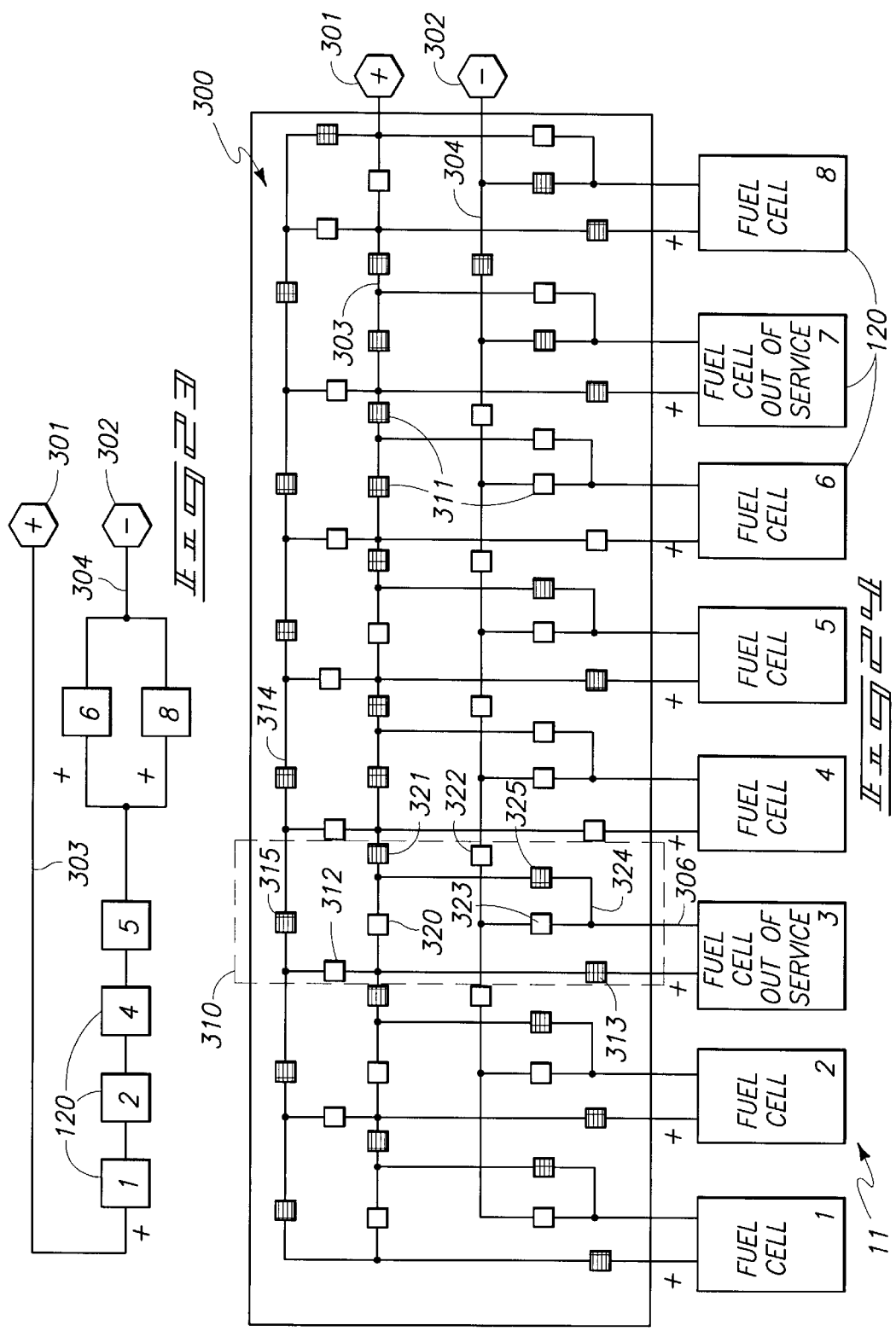

US 6,703,722 B2

RECONFIGURABLE PLURAL DC POWER SOURCE POWER SYSTEM RESPONSIVE TO CHANGES IN THE LOAD OR THE PLURAL DC POWER SOURCES

TECHNICAL FIELD

Field of the Invention

The present invention relates to a power system for supplying electrical power to a load, and more specifically to a power system having a plurality of DC power sources and which can be readily reconfigured to meet the changing power requirements of the load or changes in the performance characteristics of the respective DC power sources.

BACKGROUND OF THE INVENTION

Description of the Invention

A fuel cell is a device which can readily convert chemical energy to electrical energy by the reaction of a fuel gas with a suitable oxidant supply. In a proton exchange membrane fuel cell, for example, the fuel gas is typically hydrogen and the oxidant supply comprises oxygen (or more typically ambient air). In fuel cells of this type a membrane electrode diffusion assembly is provided and which includes a solid polymer electrolyte which has opposite anode and cathode sides. Appropriate catalysts are deposited on the opposite anode and cathode sides. During operation, the fuel gas reacts with a catalyst on the anode side to produce hydrogen ions which migrate through the solid polymer electrolyte to the opposite cathode side. Meanwhile, the oxidant supply introduced to the cathode side is present to react with the hydrogen ions in the presence of the catalyst to produce water and a resulting electrical output.

Many fuel cell designs have been provided through the years, and much research and development activity has been conducted to develop a fuel cell which meets the perceived performance and cost per watt requirements of various users. Despite decades of research, fuel cells have not been widely embraced except for narrow commercial applications. While many designs have emerged, and which have operated with various degrees of success, shortcomings in some peculiar aspect of their individual designs have resulted in difficulties which have detracted from their widespread commercial acceptance and perceived usefulness. In this regard, one of the primary shortcomings with most fuel cell designs is reliability and the lack of ability to serve a load if part of the fuel cell fails or declines in performance.

For example, one of the byproducts of fuel cell operation is heat. While some degree of heat is necessary, and even desirable, to allow the fuel cell to reach its maximum power output, too much heat can cause catastrophic failure of the same fuel cell. Further, and as noted above, another byproduct of fuel cell operation is water. Similarly with this byproduct, some water is desirable to facilitate the movement of hydrogen ions across the proton exchange membrane. However, too much water can cause the fuel cell to "flood out" resulting in the further failure. These and other types of problems can result in partial or total loss of electrical output from a portion of the fuel cell system. As a general matter in most fuel cell systems, these problems can lead to a total shutdown of the fuel cell system and the inability of the fuel cell system to serve the load in any manner. This perceived inability to serve the load notwithstanding, performance problems which may arise from time to time with individual membranes or other assemblies has seriously impeded the widespread commercial introduction and utilization of fuel cells.

Yet a further limitation in earlier fuel cell designs has long been recognized, that being, earlier fuel cell designs have on the one hand not readily scaled down to specific load applications, and on the other hand, if a failure of the fuel cell has occurred it has been difficult to address same without disconnecting the fuel cell from the load. This is undesirable, of course, in some applications where uninterruptible power requirements for critical operations such as telecommunications, navigational aides and critical computer operations mandate such types of power be provided. These and other perceived shortcomings are addressed by means of the present invention.

SUMMARY OF THE INVENTION

Therefore, one aspect of the present invention is to provide a power system for supplying power to a load which includes a plurality of DC power sources and which include at least one fuel cell which provides power to the load; and a control electronics assembly electronically coupled to the respective DC power sources and which selectively reconfigures the plurality of DC power sources to substantially serve the power requirements of the load.

Another aspect of the present invention is to provide a power system for servicing the power requirements of a load and which includes a plurality of DC power sources having predetermined operational parameters and which includes at least one fuel cell, and wherein at least one of the DC power sources has discrete portions which may be operably bypassed while any remaining portions simultaneously continue operating; and a control electronics assembly electrically coupled in voltage sensing and controlling relation relative to the respective DC power sources or portions thereof, and which upon sensing a predetermined operational condition of the plurality of DC power sources or portions thereof and/or a change in the power requirements of the load, selectively reconfigures the plurality of DC power sources or portions thereof to substantially serve the power requirements of the load.

Still a further aspect of the present invention relates to a power system for servicing the power requirements of a load and which includes a plurality of DC power sources, at least one of which is a fuel cell, and at least one of which is a charge storage device, and wherein each of the DC power sources have predetermined operational parameters, and wherein the at least one fuel cell has discrete portions which may be individually rendered inoperable while the remaining portions continue in operation, and wherein the respective DC power sources are selectively electrically coupled in electrical power delivering relation relative to the load; and a control electronics assembly is controllably coupled with each of the DC power sources and further coupled in sensing relation relative to the power requirements of the load, and the predetermined performance parameters of the respective DC power sources, and wherein the control electronics assembly reconfigures the plurality of DC power sources to meet the power requirements of the load.

Another aspect of the present invention relates to a power system which includes a plurality of DC power sources, which include at least one fuel cell, and wherein the DC sources ultimately serve as the source of power being supplied to the load. Other DC power sources which may be employed include fuel cell stacks. The power system further has a control electronics assembly coupled to each of the respective power sources. The control electronics assembly serves to collectively reconfigure, and couple, the plurality of DC power sources, by way of corresponding control elements, that is, solid state or electromechanical switches, to supply the power requirements of the load.

Another aspect of the present invention relates to a power system which has charge storage devices which typically comprise storage batteries and/or ultra-capacitors. Control electronics are provided to coordinate charging and discharging of the charge storage devices by way of corresponding control elements. Various DC power sources provide storage charging power. Discharging of the respective storage devices is performed to serve the power requirement of the load. The control electronics which are provided further include sensing ability to monitor such operating conditions as voltage and/or current of the DC power sources, charge storage devices, and the load. Other sensing may be incorporated as required. Other control elements may include valves for supplying fuel or oxidant when fuel cells are employed.

Another aspect of the present invention relates to control strategies which permit selective reconfiguration of available DC power sources. These control strategies may be automatically executed by way of a control electronics assembly and other control elements as a result of sensing predetermined operating conditions. This control strategy arrangement makes it possible for a portion, or entire fuel cells to be removed from service or electrically or physically bypassed while other DC power sources and/or charge storage devices continue to substantially supply the power requirements of the load.

Still another aspect of the present invention relates to a power system which substantially supplies the power requirements of a load, and wherein the power system has a plurality of DC power sources, and wherein at least one of which is an ion exchange fuel cell module. Each ion exchange fuel cell module produces heat energy during operation. Further a bifurcated air flow is provided to dissipate the heat energy typically to the ambient environment. Other DC power sources may comprise individual fuel cells and fuel cell stacks in combination with the fuel cell module.

Another aspect of the present invention relates to a power system which includes charge storage devices such as; storage batteries; and ultracapacitors. In this arrangement control electronics and control elements are provided which selectively couple and decouple each of these DC power sources and the load, into various circuit configurations. This electrical switching arrangement allows a substantially constant supply of power to the load. Additionally, a control electronics assembly is provided and which has a sensing ability for monitoring the operating conditions of each of the DC power sources.

Another aspect of the present invention relates to control elements which provide for the effective delivery of fuel and air to individual fuel cell modules or stacks, and the electrical coupling and decoupling of system devices, that is other DC power sources, to the accompanying load.

Still another aspect of the present invention relates to electrical bypassing or shunting of fuel cell modules or stacks through the manipulation of switch-type control elements. This electrical bypassing or shunting facilitates the shutdown; servicing; replacement and/or startup of individual DC power sources or storage devices while the remaining DC power sources substantially supply the power requirements of the load. Appropriate operator interface is provided which allows for adjustment of shunting cycles (as needed); manual override; and monitoring of various operating conditions.

Still another aspect of the present invention relates to control electronics and control elements which permit the generation of AC power to be supplied to a load. This is achieved through the synchronized, cyclic coupling and decoupling of individual DC power sources in a series circuit arrangement so as to approximate a sine-wave power signal that is then coupled to the load. In the event that the power requirement is dynamic in nature (changing over time) the voltage of the resulting alternating current power may be varied through the addition or subtraction from the number of individual DC power sources and/or storage elements which are coupled to the load during any particular phase of the generating cycle.

Another aspect of the present invention relates to a power system which substantially supplies the power requirements of a load and which includes a plurality of different DC power sources such as fuel cell stacks; ion exchange fuel cell modules; segmented fuel cells; photovoltaic panels; wind generation; hydro-generation; storage batteries and/or ultra-capacitors.

Yet a further aspect of the present invention relates to a control electronics assembly having corresponding control elements and sensing ability which is configured for the measurement of system operating conditions, that is voltage; current; temperature; and other operating parameters of both the respective DC power sources and the load. Operator interface is provided for the control electronics and which permits human interrogation of system operating conditions and adjustment of control strategies, as well as override; startup; and shutdown capabilities both locally and remotely.

Another aspect of the present invention relates to a memory provided with the control electronics assembly and which provides for the automated operation of the power system based upon predetermined operational conditions stored within such memory. In this regard, should the voltage of a DC power source, such as that provided by a particular fuel cell segment decay to a predetermined value, the control electronics assembly and corresponding control elements may react appropriately by electrically shunting, or bypassing that particular segment; curtail the fuel and/or air supply to the affected fuel cell segment; and/or alert a human operator by way of an operator interface to the conditions so that appropriate corrective action may be provided.

These and other aspects of the present invention will be discussed in further detail hereinafter.

BRIEF DESCRIPTION OF THE DRAWINGS

Preferred embodiments of the invention are described below with reference to the following accompanying drawings.

FIG. 1 is a simplified schematic view of a power system of the present invention.

FIG. 2 is a perspective view of a modular fuel cell power system having usefulness in the present invention.

FIG. 3 is a sectional view of the modular fuel cell power system of FIG. 2 taken from a position along line 2—2 of FIG. 2.

FIG. 4 is a fragmentary, exploded view of a fuel cell module employed in the modular fuel cell power system of FIG. 2.

FIG. 7 is a fragmentary, side elevation view of a segmented fuel cell stack of the present invention.

FIG. 9 is a fragmentary, exploded, side elevation view of positive and negative current collectors as used in a segmented fuel cell stack as seen in FIGS. 6–8.

FIG. 10 is a fragmentary, exploded, side elevation view of positive and negative current collectors as used in a segmented fuel cell stack as seen in FIGS. 6–8, and which has an electrical insulating element disposed therebetween.

FIG. 12 is a second schematic diagram of an alternative form of the present invention.

FIG. 13 is a third schematic diagram of yet another form of the present invention.

FIG. 14 is a fourth schematic diagram of another form of the present invention as seen in FIG. 12.

FIG. 15 is a fifth schematic diagram of yet another embodiment of the present invention.

FIG. 17 is a seventh schematic diagram illustrating an exemplary series circuit arrangement which is useful in the present invention.

FIG. 18 is the series circuit arrangement shown in FIG. 17.

FIG. 19 illustrates a parallel circuit arrangement which finds usefulness in the present invention.

FIG. 20 is the parallel circuit arrangement shown in FIG. 19.

FIG. 21 illustrates a series/parallel circuit arrangement which finds usefulness in the present invention.

FIG. 22 is the series/parallel circuit arrangement shown in FIG. 21.

FIG. 23 illustrates a second example of a series/parallel circuit arrangement which finds usefulness in the present invention.

FIG. 24 is the series/parallel circuit arrangement shown in FIG. 23.

DETAILED DESCRIPTION OF THE PREFERRED EMBODIMENTS

Figure 6:
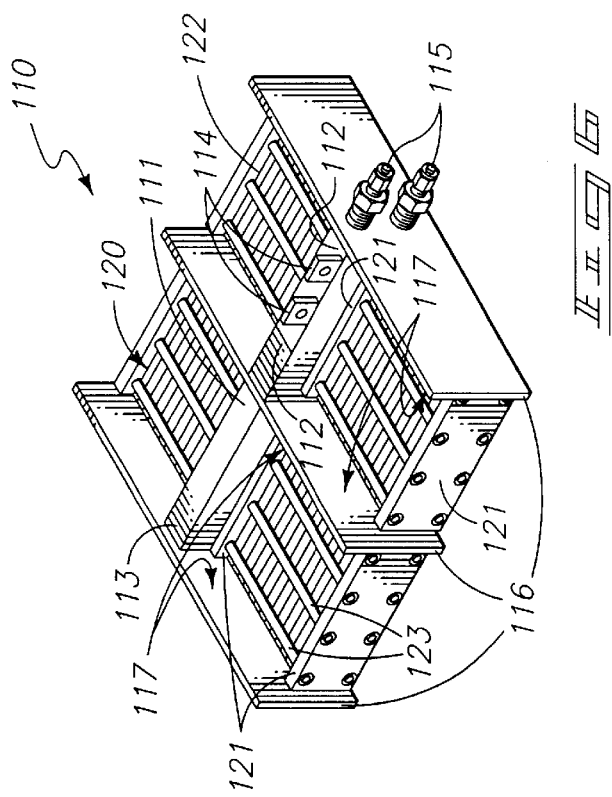
FIG. 6 is a perspective view of a second form of a fuel cell stack assembly which find usefulness in the present invention.

This disclosure of the invention is submitted in furtherance of the constitutional purposes of the U.S. Patent Laws "to promote the progress of science and useful arts" (Article 1, Section 8).

The power system of the present invention is generally indicated by the numeral 10 as seen in FIG. 1. As shown therein, the power system 10 is operable to supply the power requirements of a load. The power system 10 includes a plurality of DC power sources generally indicated by the numeral 11. The plurality of DC power sources includes at least one fuel cell 12 which provides power to the load. Still further, a control electronics assembly is generally indicated by the numeral 13 and which is electrically coupled to the respective DC power sources 11 and which selectively reconfigures the plurality of DC power sources to substantially serve the power requirements of the load 14. The load 14 could include any type of equipment which has a constant electrical demand or an electrical demand which is variable (dynamic) over time.

Referring now to FIG. 2 a first DC power source 11 is shown, that being a modular ion exchange fuel cell 20. As illustrated, the modular ion exchange fuel cell includes a subrack generally indicated by the numeral 21. The subrack releasably supports a plurality of ion exchange membrane fuel cell modules 22 in an operable arrangement. The subrack 21 includes a principal enclosure 23. The principal enclosure 23 is defined by a top surface 24; bottom surface 25; front sidewall 30; rear sidewall 31; left sidewall 32; and right sidewall 33. In this arrangement, the principal enclosure will receive a plurality of modules 22, each enclosing a membrane electrode diffusion assembly (not shown). As seen in FIG. 2 the modular ion exchange membrane fuel cell 20 is configured in a manner where at least one of the modules 22 can be easily removed from the subrack 21, by hand, while the remaining modules continue to operate. As noted, this removal is normally accomplished without the use of any tools, however it may be necessary in some commercial and industrial applications whereby vibration, and other outside physical forces may be imparted to the device, to use threaded fasteners and the like to releasably secure the individual modules to the subrack 21 to prevent the unintentional displacement or dislocation of the respective modules 22 from the subrack 21. If utilized, hand tools which will be employed will be simple hand tools, and the removal will be accomplished in minutes, as opposed to the prior art stack arrangements where replacement of a damaged membrane electrode diffusion assembly (MEA) may take hours to accomplish. In the arrangement shown in FIG. 2 each fuel cell module 22 can be utilized as individual, discrete DC power sources 11.

Still referring to FIG. 2, a plurality of individual module apertures 40 are formed in the front sidewall 30 of the principal housing or enclosure 23, and are operable to individually receive the respective fuel cell modules 22, and position them in predetermined, space relation, one to the other. The individual ion exchange membrane fuel cell modules 22 are coupled in fluid flowing relation to a source of a substantially pure or dilute fuel generally indicated by the numeral 41. The fuel supply may comprise a source of bottled and compressed fuel gas generally indicated by the numeral 42; or a fuel gas stream which is provided by way of a chemical reactor or reformer 43 which produces the fuel stream for use by individual ion exchange fuel cell modules 22. A conduit 44 would couple either the fuel gas supply 42 or 43 with the respective ion exchange fuel cell modules 22 and the associated subrack 21. When a chemical reformer 43 is provided, the reformer would receive a suitable hydrocarbon stream such as natural gas; propane; butane; and other fuels and would thereafter, through a chemical reaction, release a fuel gas stream which would then be delivered by way of the conduit 44. The modular ion exchange fuel cell 20 may also include a fuel gas recovery and recycling system (not shown) which would recover or recapture unreacted fuel gas which has previously passed through the individual ion exchange fuel cell modules 22. This system, in summary, would separate the unreacted fuel gas and would return the unreacted fuel gas back to the individual ion exchange fuel cell modules 22 for further use. This recovery system would be coupled with a byproduct removal line (not shown).

Referring now to FIG. 3, a longitudinal, vertical, sectional view of a modular ion exchange fuel cell 20 is shown, and wherein a fuel cell module 22 is supported on a subrack 21. As seen in this sectional view, a fan 50 is provided and which is supported within the principal enclosure 23. The fan provides an air flow 51 across and/or through the modules 22. The air flow 51 provides both heat dissipation and/or cooling, and an oxidant supply for the fuel cell modules 22 during operation. The subrack 21 and the principal enclosure 23 further defines an internal plenum 52; and a moveable vane or air valve 53 is provided within the air plenum. An actuator 54 is also provided which moves the vane into an appropriate orientation relative to the air plenum 52. An air filter 55; and an exhaust vent 56 are provided and are formed in the rear sidewall 31 as seen in FIG. 3. As illustrated, intake air which is generally indicated by the numeral 60 enters the subrack 21 or principal enclosure 23, through the air filter 55 and travels along the air plenum 52. The actuator 54, as noted above, angularly positions the vane or air valve 53 within the internal air plenum 52 such that exhaust air 61 exits through vent 56 or is repeatedly recycled in whole or in part through the several modules 22. Fuel 41 is supplied to module 22 through the conduit labeled 62 as seen in FIG. 3. Further, waste water is exhausted through conduit 63. Suitable electrical connections (not shown) are further provided so that electrical current may be delivered through external circuitry which will be discussed in greater detail hereinafter. The modular ion exchange membrane fuel cell 20 has at least one ion exchange membrane fuel cell module 22 which produces heat energy during operation. The air flow 51 is delivered to each of the modules 22 where it is further bifurcated to dissipate the heat energy which is generated during operation. In this regard, one portion of the air flow passes through the respective modules and another portion passes over the outside thereof, as will be discussed, below.

Referring now to FIG. 4 an exploded perspective view of an ion exchange fuel cell module 22 is shown. A typical module 22 includes a nonconductive, dielectric support member 70. The support member 70 can be fashioned out of various synthetic polymeric substrates. The support member 70 has a main body 71 which includes opposite sidewalls or major surfaces generally indicated by numeral 72. A plurality of spaced ribs 73 are borne by, or made integral with the respective sidewalls 72, and are disposed in spaced relation, one to the other. Cavities 74 are defined between the respective ribs 73 on each sidewall 72. A pair of orientation members 75 are located between each of the ribs 73, and define a space therebetween. A fuel coupling 80 (FIG. 3), is made integral with, or forms a portion of a rearward peripheral edge of the support member 70. The fuel coupling 80 includes a fuel delivery passageway 81. Further as seen in FIG. 3, the fuel coupling 80 also includes an exhaust passageway 82. Returning now to FIG. 4, individual current collectors 83 are respectively received within corresponding cavities 74 defined by the main body 71. The module 22 further comprises a current conductor assembly 84 which is located generally along the top peripheral edge of the main body 71 of the dielectric support member 70. Each current collector 80 is electrically coupled to the current conductor assembly 84. The module 22 further includes a pair of opposed, anode heat sink members 85. Yet further, module 22 also includes handles 86 which allows it to be conveniently manipulated by hand. As seen, the fuel cell module 22 is held together by means of a number of fasteners 87 which are received through each of the anode heat sinks. Membrane electrode diffusion assemblies (not shown) are received on each side of the dielectric support member, 70. Each membrane electrode diffusion assembly has an anode side, and an opposite cathode side. In the arrangement shown in FIG. 4, the cathode sides of the respective membrane electrode diffusion assemblies are proximally related and the anode side are distally related. As noted above, one portion of the bifurcated air flow is supplied to, and passes through, the module 22. This portion is supplied to the cathode side of each membrane electrode diffusion assembly. Further, one portion of the bifurcated air flow also passes over each of the anode heat sinks 85. In this arrangement, less than a preponderance of the heat energy generated during operation of the fuel cell module 22 is removed by way of that portion of the bifurcated air flow provided to the respective cathodes. Moreover, a preponderance of the heat energy is removed by way of that portion of the bifurcated air flow passing over the respective anode heat sinks 85. The fuel cell module 22 is discussed in further detail in U.S. patent application Ser. No. 09/577,407 which is incorporated by reference herein.

Figure 5:
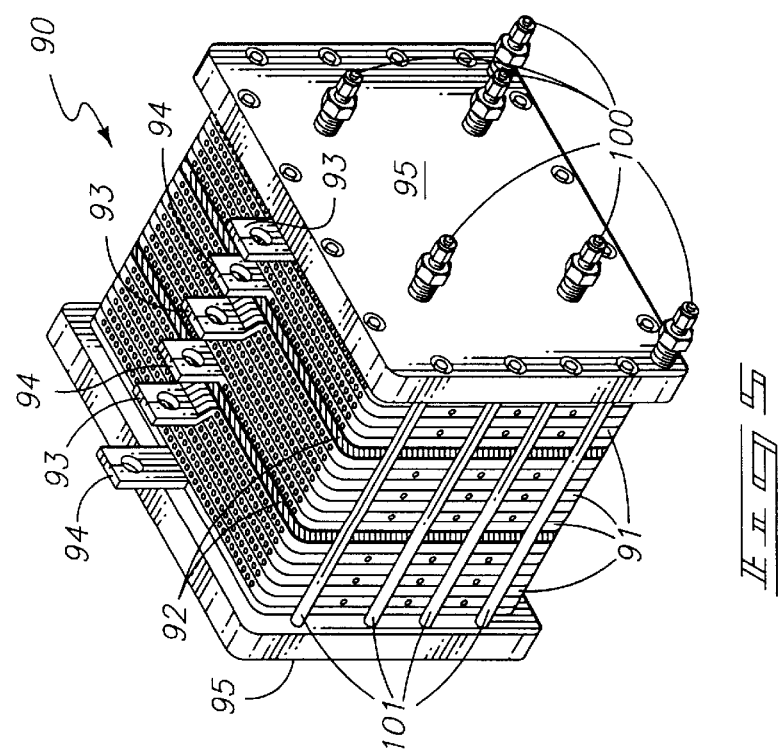
FIG. 5 is a perspective view of a segmented fuel cell stack which finds usefulness in the present invention.
Figure 8:
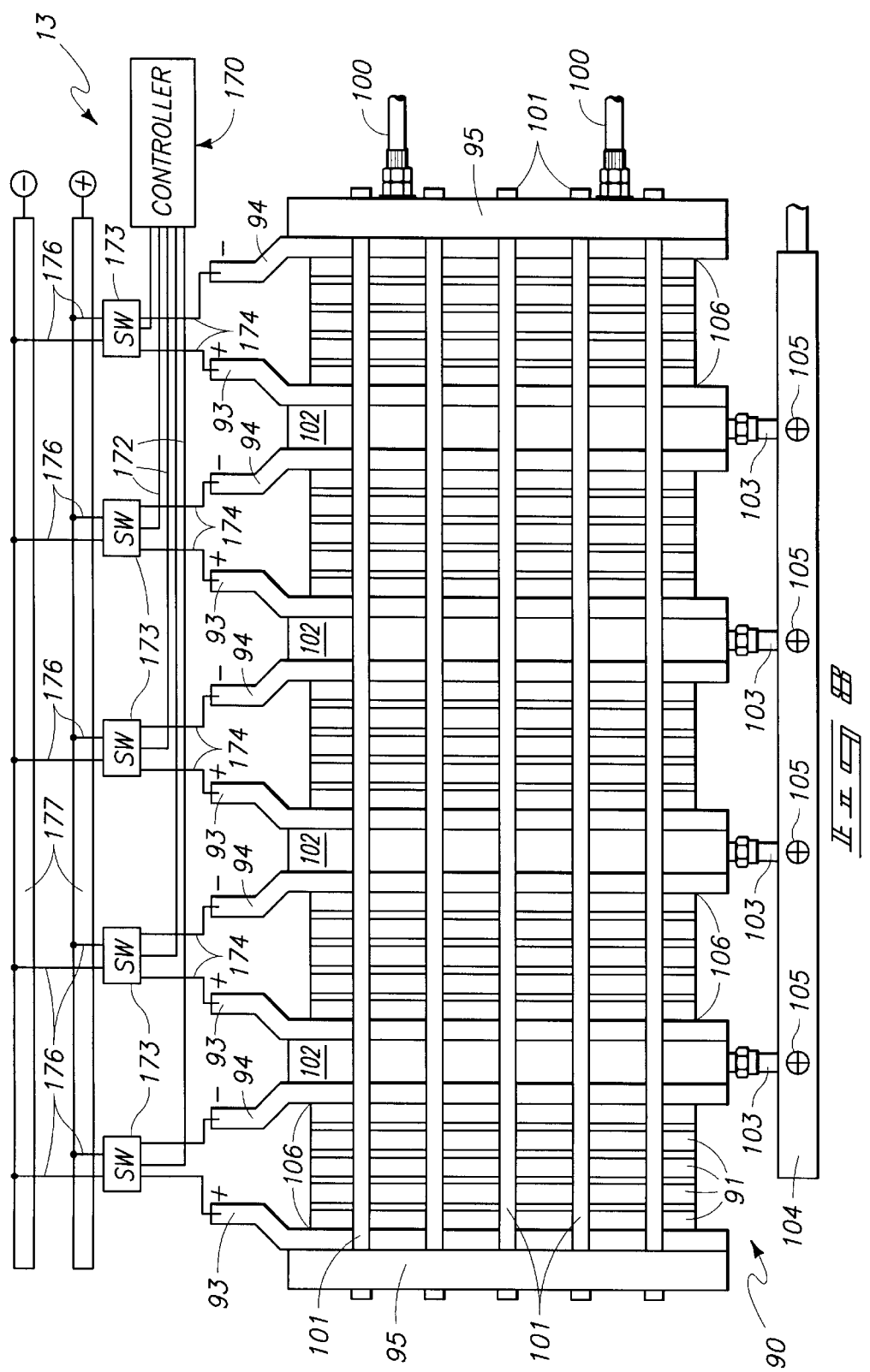
FIG. 8 is a fragmentary, side elevation view of a second form of a segmented fuel cell stack which finds usefulness in the present invention.

FIGS. 5, 7 and 8 show several views of alternate embodiments of a segmented fuel cell stack 90, which may also serve as one of the several DC power sources 11. The respective segmented stacks 90 are of somewhat conventional design. Each possesses a plurality of substantially coaxially aligned proton exchange membranes 91; insulator plates 92 which are positioned therebetween (FIG. 5); positive polarity current collectors 93; and negative polarity current collectors 94. Each segmented fuel cell stack 90 further has opposed end plates 95 which place the respective proton exchange membranes into compression. At least one of the end plates 95 has a number of fluid couplers 100 made integral therewith. The respective fluid couplers allow the delivery of fuel; and oxidant to the various proton exchange membranes, and further allows the removal of the byproduct water, and any other resulting contaminants. Further still, coolant may be delivered through one of the fluid couplers in certain designs. The respective end plates 95 cooperate with a number of threaded rods or fasteners 101 which maintain the previously discussed elements in the stack in a state of compression. Electrical connection to the stack 90 is established at each of pairs of current collectors 93 and 94, to permit current to flow to a load 14.

As seen in FIGS. 7 and 8 the segmented fuel cell stack 90 may include a plurality of heat exchange elements 102 which are individually positioned between respective pairs of adjacent current collectors 93 and 94. It should be noted that heat exchange element 102 also operates as an electrical insulator. The heat exchange element 102 has a fluid passageway formed therein (not shown). Each of the heat exchange elements are individually coupled in fluid flowing relation with a fluid conduit 103. Still further each conduit, in turn, is coupled in fluid flowing relation to a fluid manifold 104 by way of a selectively controllable valve 105. The control of the fluid manifold and associated valves will be discussed in greater detail hereinafter.

FIGS. 9 and 10 provide somewhat simplified, fragmentary, exploded, side elevation views of the heat exchange element 102 and adjacent current collectors 93 and 94 of the segmented fuel cell stack 90. FIG. 9 illustrates a heat exchange element 102 disposed between a pair of adjacent current collectors 93 and 94. FIG. 10 illustrates an insulator plate 92 disposed between the adjacent current collectors. Each of the current collectors are fabricated of electrically conductive material throughout. Further, it will be seen in this arrangement that the insulator plate 92 or heat exchange element 102 allows the stack 90 to be segmented into discrete portions 106 which can be utilized as individual, discrete DC power sources 11. The segmented fuel cell stack arrangement 90 provides a convenient means by which the fuel cell 90 may remain in operation notwithstanding the failure, or decrease in performance of any of its respective portions 106. For example, the present power system 10 is operable by way of the control electronics assembly 13 to withdraw power from individual portions 106, or the entire stack 90, based upon the power needs of the load 14, or the performance of the segmented fuel cell stack or portions thereof. The specifics of one form of a segmented fuel stack arrangement which finds usefulness herein is found in our U.S. patent application Ser. No. 09/986,806, which was filed on Nov. 13, 2001 and which is entitled "Power Tap Device; Fuel Cell Stack; and Method of Dividing a Fuel Cell Stack," the teachings of which are incorporated by reference herein.

Another possible DC power source 11 which may find usefulness in the present invention is an aggregate fuel cell which is generally indicated by the numeral 110 in FIG. 6. As shown therein, the aggregate fuel cell has a common manifold or plenum 111. The plenum has a first end 112, and an opposite second end 113. Within the common manifold or plenum is an electrical conduit (not shown) which terminates at a pair of electrical terminals or outputs 114. As should be understood, electrical power generated from the aggregate fuel cell may be removed through these electrical terminals 114. Still further, fuel and oxidant couplings 115 are provided, and which allow the delivery of fuel and oxidant to the aggregate fuel cell 110. It will be seen that a plurality of support members 116 are provided, and which define individual docking stations 117. The individual docking stations are operable to receive individual fuel cell stacks which are generally designated by the numeral 120. The fuel cell stacks are of substantially conventional design having opposite end plates 121, and a plurality of proton exchange membranes 122 positioned therebetween. The proton exchange membranes are placed into compression by a plurality of threaded rods or fasteners 123. The fuel cell stacks 120 are releasably electrically coupled to the electrical conduit. With some effort the individual fuel cells 120 may be removed from their individual docking stations 117 for maintenance, modification, replacement or the like. It should be understood that the individual fuel cell stacks may constitute one of the plurality of DC power sources 11 which provide power to the load 14.

Referring now to FIGS. 1, 7, and 10–15 respectively, it will be seen that the multiple DC power sources 11 may include charge storage devices such as ultracapacitors 130 (FIGS. 7 and 10) or an ultracapacitor bank 131 (FIGS. 1 and 11) which may be periodically charged with electrical power, from another source, and then selectively discharged in order to provide the required electrical power to the load 14. Ultracapacitors 130 (FIG. 10) of this nature may be purchased from Maxwell Manufacturing and are well known in the art. As will be appreciated, ultracapacitors 130 may be put into bank type arrangements 131, as more fully discussed in our U.S. patent application Ser. No. 09/864,526 which is incorporated by reference herein. Still further, the multiple DC power sources 11 may include various types of batteries 140 (FIG. 10), and accompanying battery banks 141 (FIG. 1). These batteries 140, and battery banks 141, may include various types of conventional lead acid type batteries. These particular charge storage devices are well known in the art, and further discussion of these devices is not warranted in this application.

Finally, it will be understood that the multiple DC power sources 11 of the present invention could include a whole host of other devices such as solar, wind generated or other DC power sources 150 (FIG. 1) which may be coupled by way of various interface circuitry to the load 14 to be serviced. The accompanying circuitry and controllers for utilizing same will be discussed in greater detail hereinafter.

Referring now to FIG. 7 the segmented fuel stack 90 includes a number of portions 106 which are electrically isolated, one from the other. Each of these portions 106 may constitute one of the plurality of DC power sources 11 which provide power to the load 14. Similarly and as earlier discussed, each module 22 could constitute a discrete DC power source 11. Referring now to FIGS. 1 and 7, a control electronics assembly 13 is provided and which includes a controller generally indicated by the numeral 170. The controller may be purchased from any number of manufacturers and may be programmed by way of an operator interface both locally and remotely. Such will be discussed in greater detail hereinafter. Yet further, the controller 170 may be made integral with an off-the-shelf multi-purpose computer which may have a host of other operational components such as a memory. These features will also be discussed hereinafter. A plurality of electrical paths 172 (FIG. 7) electrically couple the controller 170, with individual electrical switches 173. These switches may be of various forms and from assorted manufacturers. As a general matter, however, the controller 170 is operable to electrically open, and close the respective switches 173 in a fashion which will be discussed below. Still further, an electrical pathway generally indicated by the numeral 174, couples the respective current collectors 93 and 94 with each of the respective switches 173. During operation, as the individual portions 106 produce electrical current, the electrical current is first made available to the respective switches 173, and then by way of the electrical pathway 175 to the ultracapacitors 130. The ultracapacitors 130 then store that electrical power for later release. Still further, an electrical pathway 176 couples the electrical switch to an electrical bus or other pathway 177. This same bus or pathway is electrically coupled to the load 14. As should be understood, and based upon the position of the respective switches 173, as determined by the controller 170, the ultracapacitors 130 can be repeatedly charged and discharged, in assorted cycles, or in various combinations, as desired, in order to provide an appropriate amount of electrical power to the load 14.

As earlier discussed, a power system 10 for supplying the electrical power requirements of a load 14 includes a plurality of DC power sources 11 which include at least one fuel cell 90 and which provides power to the load 14. A control electronics assembly 13, which includes a controller 170 is electrically coupled to the respective DC power sources 11 and which selectively reconfigures the plurality of DC power sources to substantially serve the power requirements of the load. As seen, in FIG. 7, for example, the controller 170 can selectively reconfigure each of the portions 106, which comprise separate DC power sources 11, to substantially serve the power requirements of the load 14. Yet further, the plurality of DC power sources, as illustrated in FIG. 7, may include a plurality of ultracapacitors 130 that are electrically coupled to the fuel cell 90 and the load 14. In this arrangement, the controller 170, senses the voltage and other requirements of the load (FIG. 1), and thereafter charges and then discharges the ultracapacitors 130 by way of the switches 173 such that the load 14 is substantially served. The load, as earlier discussed, may be substantially constant (FIG. 1) or dynamic (FIG. 2) (changing over time). Therefore the controller 170 can maintain the ultracapacitors 130 in a charged, ready state, and then discharge them at any frequency, or in any combination which would serve to supply the appropriate amount of electrical power to the load 14. Still further, in the arrangement as shown, the power system 10 permits the individual portions 106 to be electrically bypassed while the remaining fuel cell portions substantially serve the load 14. In this regard, it should be understood that malfunctions do occur in fuel cell stacks such as what is illustrated. To sense these malfunctions, the control electronics assembly 13 is coupled in voltage sensing relation relative to the plurality of DC power sources 11, and the load 14, and further may be supplied with other sensor information, which would provide an indication of a malfunctioning fuel cell portion 106. The control electronics assembly 13, upon sensing a predetermined voltage condition of at least one of the plurality of DC power sources then reconfigures the plurality of DC power sources, by selectively electrically coupling and or decoupling the respective DC power sources (portions 106) to service the load. Thus, if a portion 106 begins to malfunction the controller 170 is operable to substantially bypass the malfunctioning portion 106. This action further prevents a catastrophic failure of the remaining portions of the fuel cell 90.

FIG. 8 shows another form of the present invention utilizing the segmented fuel cell stack 90 as previously disclosed. Again, in this form of the invention, controller 170 is electrically coupled by way of electrical pathway 172 to switches 173. Similarly, the switches are electrically coupled by way of the electrical pathway 174 to the current collectors 93 and 94. Yet further the switches 173 are electrically coupled to an electrical bus or pathway 177 by way of electrical pathway 176. In this particular form of the invention, the individual portions 106 comprise the individual DC power sources 11; and the controller 170 is operable, upon sensing a predetermined operational condition of any of the plurality of portions 106 or portions thereof, and/or a change in the power requirements of the load, to selectively reconfigure the plurality of DC power sources 11 or portions 106 thereof, to substantially serve the power requirements of the load 14. The earlier discussion regarding bypassing failing portions 106, as described above, applies equally to this form of the invention.

Figure 11:
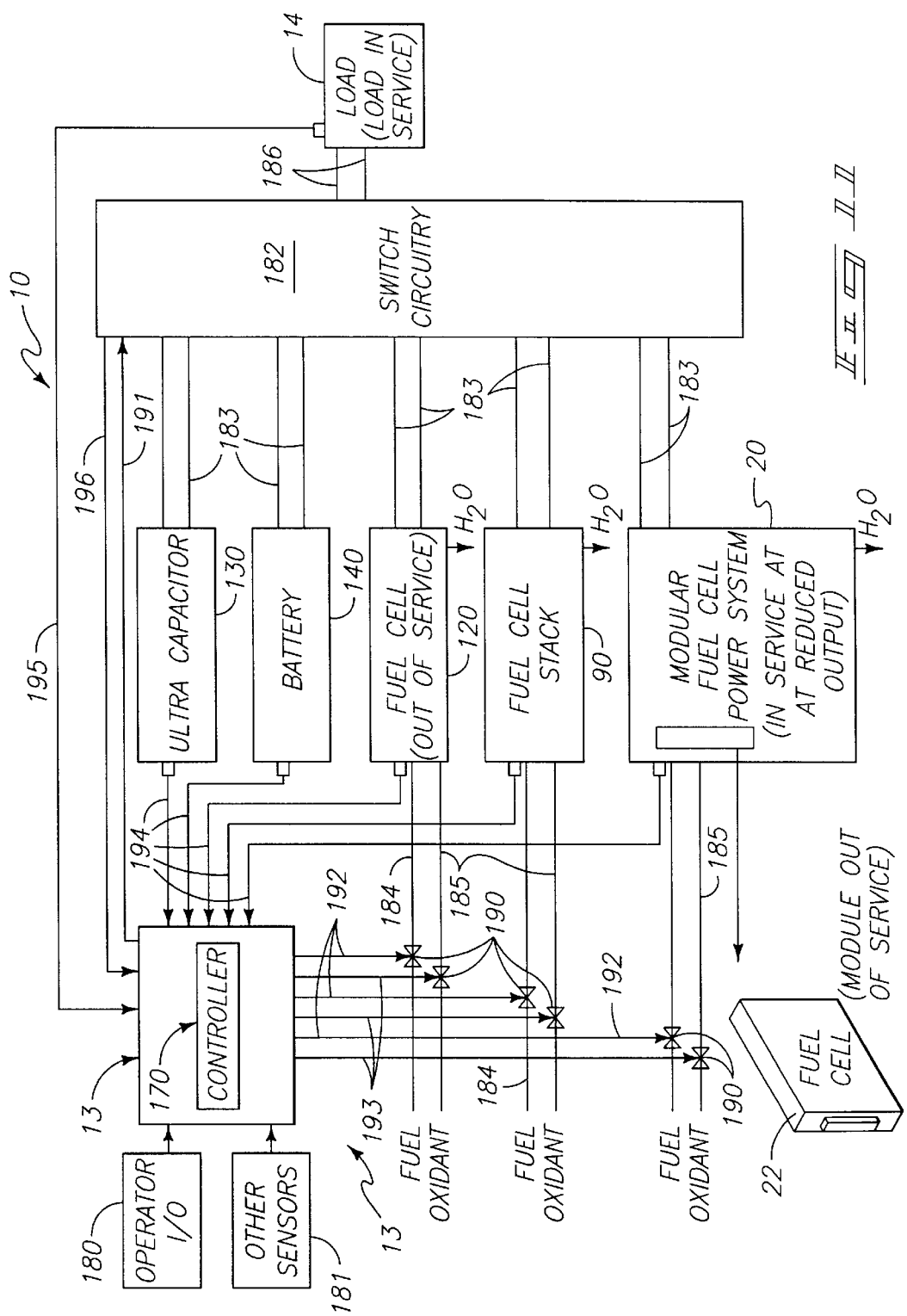
FIG. 11 is a schematic diagram showing the broad features of the present invention.
Figure 11:
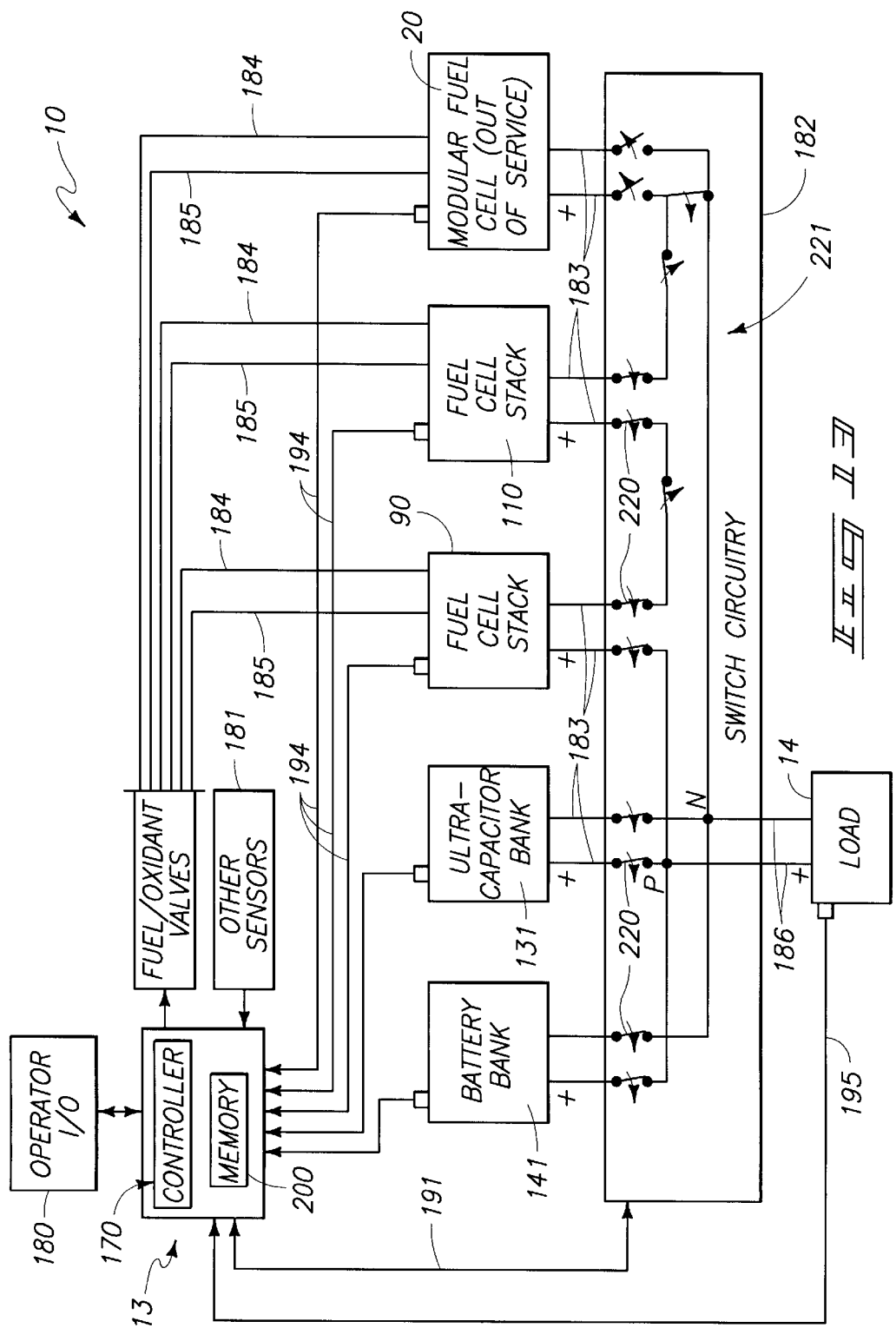
Figure 11:
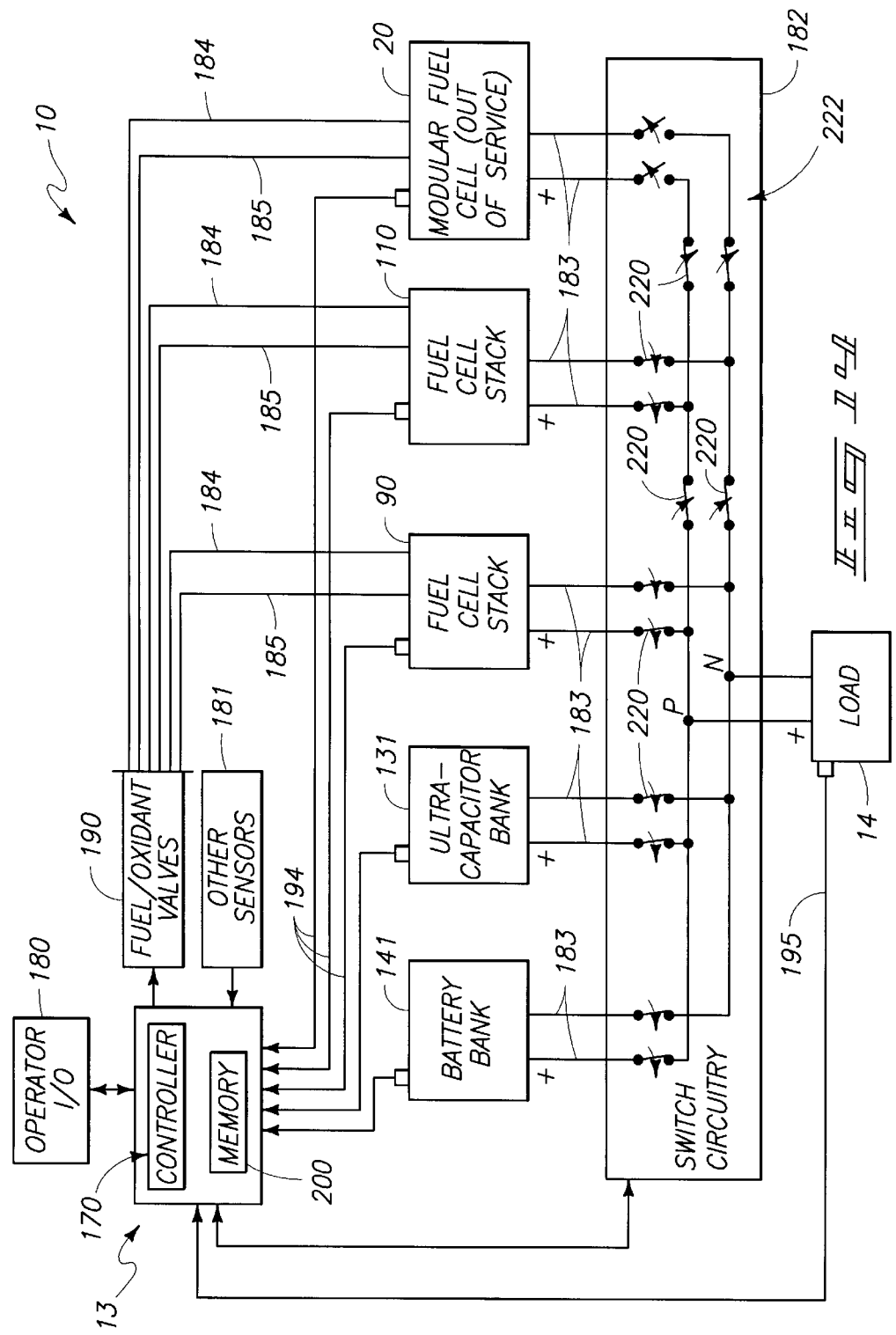

Referring now to FIG. 11 a schematic diagram showing the broad features of the present invention 10 is illustrated. As seen therein, the control electronics assembly 13, and more specifically the controller 170, is coupled in signal transmitting, and receiving relation relative to the various DC power sources 11 which may include, but is not limited to a modular fuel cell power system 20 and its individual modules 22; a segmented fuel cell stack 90 and its individual portions 106; a plurality of fuel cell stacks 120, that may be arranged in an aggregate fuel cell 110 or the individual fuel stacks 120; a battery 140 or battery bank 141; and an ultracapacitor 130, or ultracapacitor bank 131. The control electronics assembly 13 provides a means 180 for operator input to the control electronics assembly 13 to change or modify the operation of the power system 10. This feature also permits the operator to receive information regarding the current status or performance of the power system 10. Other sensors 181, may be provided, and which supply information to the control electronics assembly 13. This sensor information 181 may further modify the manner of operation of the respective DC power sources 11 or the power system 10 as a whole. Yet further, this additional sensor information 181 may signal other undesirable conditions such as potentially harmful fuel leaks; failing or declining performance indicia of the various DC power sources 11; or the like. As illustrated, switch circuitry 182 of various designs, may be utilized in the present invention. The switch circuitry 182 is electrically coupled with the plurality of DC power sources 11 by way of an electrical pathway 183. Fuel and oxidant supply lines 184, and 185, are provided to each of the fuel cells utilized in this form of the invention. Still further, an electrical pathway 186 is provided which electrically couples the switch circuitry 182 with the load 14. As seen in FIG. 11, a plurality of selectively controllable valves 190 are disposed in fluid metering relation relative to the respective fuel and oxidant supply lines 184 and 185, respectively. The controller 170 is operable to transmit a control signal 191 to the switch circuitry 182 such that it can selectively reconfigure the plurality of DC power sources in order to provide substantially constant electrical power to the load 14. Control signals 192 and 193, respectively, are provided to the fuel and oxidant valves 190 in order to place them in various fluid metering relationships relative to the fuel and oxidant supply lines 184 and 185. A performance output signal 194 is provided by each of the DC power sources 11 and these are each supplied to the control electronics assembly 13 and the controller 170, so that the operational conditions of each of the plurality of DC power sources or portions thereof may be monitored by the operator 180. Yet further, a load demand signal 195 is provided by the load 14, and is received by the control electronics assembly 130. The load demand signal 195 provides a means by which the control electronics assembly 13, and the controller 170 can then appropriately respond, through the switch circuitry 182, to electrically reconfigure the plurality of DC power sources 11, to serve a changing power requirement of the load 14. A status or performance output signal of the switch 196 is also provided to the control electronics assembly 13, in order to provide information regarding the performance and positions of the respective switches. As illustrated in FIG. 11 it will be seen that one of the fuel cells 120 is labeled as being out of service. Further, the modular fuel cell power system 20 has a module 22 which is also out of service. As earlier discussed, the present power system 10 for servicing the power requirements of the load 14 provides a convenient means whereby the control electronics assembly 13 can, upon sensing declining performance of a respective DC power source 11, couple other DC power sources 11 to the load 14 such that it is substantially serviced.

Referring now to FIG. 12, a second schematic diagram of an alternative form of the present invention 10 is shown and which has many features previously discussed with respect to FIG. 11. In this particular arrangement, a plurality of DC power sources 11 are provided and which may include a battery bank 141; ultracapacitor bank 131, fuel cell stacks 90 and 120; a fuel cell stack which has been electrically bypassed 110; and a modular fuel cell power system 20. As illustrated, the modular fuel cell power system 20 has a module 22 which is presently out of service. As with FIG. 11, each of the plurality of DC power sources 11 are electrically coupled to switch circuitry 201 which has inverter capability. The switch circuitry 201 is electrically coupled to a dynamic AC load which is designated by the numeral 14. As was the case with the previous form of the invention described in FIG. 11, above, fuel and oxidant are provided to the respective fuel cells by way of fuel and oxidant delivery lines 184 and 185 respectively. Selectively controllable valves 190 are also provided and which are disposed in fluid metering relation relative to these fuel and oxidant supply lines. The controller 170 is operable to provide control signals 191 to the switch circuitry 201 in order to control the operation of same. Yet further, a load demand signal 195 is provided by the AC load 14 in order to provide information to the controller 170 regarding the continuing dynamic AC load demands. In this form of the invention, a memory 200 is provided, and which is made integral with the control electronics assembly 13 such that the operator 180 can input specific commands to the controller 170 for servicing the load demands 14, and further can interrogate the memory 200 of the power system 10, as to the historical performance of same. Further, the memory 200 can be utilized to predict or anticipate changes in the dynamic load 14 based upon historical information which is archived within the memory 200.

As with the previous form of the invention 10, the control electronics assembly 13 is operable to sense the performance characteristics of each of the DC power sources 11, and in the case of fuel cell stacks, such as 90, may electrically bypass portions 106 (FIG. 7) of the fuel cell stack which are failing or otherwise declining in performance, while the remaining portions 106 of the fuel cell stack substantially meet the power requirements of the load 14. This electrical reconfiguration, as discussed above, may include taking the DC outputs of the individual DC power sources and additively combining or subtracting them to provide a desired DC current output which can then be manipulated by the switch circuitry 201 to provide an appropriate AC power requirement needed for the AC load 14. As with the previous forms of the invention, the electrical reconfiguration of the DC power sources 11 to substantially serve the load 14 may be based upon sensing a change in the electrical power requirement of the load, or on the other hand, sensing a predetermined voltage condition, or other performance parameter of at least one of the plurality of DC power sources 11 and thereafter selectively electrically coupling or decoupling the respective DC power sources 11 to serve the load.

Referring now to FIGS. 13 and 14 respectively, more details regarding the earlier form of the invention shown in FIG. 11 is now illustrated. As seen therein, the control electronics assembly 13 is provided with a memory 200 which is operable to receive operator input 180 regarding the performance of the invention 10. The several fuel and oxidant valves 190 are coupled in fluid metering relation relative to the various DC power sources utilizing same, such as the fuel cell stack 90; fuel cell stack 110; and the modular fuel cell power system 20. As illustrated, the switch circuitry 182 includes a plurality of electrical switches 220 which may be placed into various electrical configurations. As illustrated in FIG. 13, a serial electrical arrangement 221 is shown. As will be understood by a study of the positions of the individual switches 220, the modular fuel cell power system 20 has been decoupled from the load 14. In contrast, and referring now to FIG. 14, a parallel circuit arrangement 222 is provided. In FIG. 14, the modular fuel cell power system 20 has also been decoupled from the load 14.

Referring now to FIGS. 1 and 15, the invention 10 is found in much more significant detail in each of these views. It will be recognized when comparing FIGS. 1 and 15 that FIG. 1 shows the power system 10 using circuitry such as what is illustrated in either FIGS. 13 and 14, that is, serial or parallel circuitry. Further, it should be understood in FIG. 15, that the switch circuitry also includes inverter capability to service an accompanying AC load 14. It will be seen from a study of these two views that a control signal 241 is provided to the manifold 104 of the segmented fuel cell 90. As earlier discussed, selectively controllable valves 105 meter coolant from the manifold 104 to the heat exchanger elements 102 for the purposes removing heat which is a byproduct of fuel cell operation. As seen in FIGS. 1 and 15 a coolant supply line 242 is provided to each of the fuel cells. As earlier discussed, the various DC power sources 11 including the several fuel cells that have been disclosed, may need auxiliary cooling, and therefore this coolant line is operable to couple the various fuel cells with a source of coolant. As seen in the drawings, a fuel supply 244; oxidant supply 245; and coolant source 250 are provided. These are coupled in fluid flowing relation with fuel, oxidant, and cooling valves 246 which meter the respective fluids to the individual fuel cells. Control signals 251, 252, and 253 are provided to each of the fuel, oxidant, and coolant supplies. Still further, interface circuitry 254 is provided which electrically couples solar or other alternate DC power sources to the switch circuitry 182. As seen in FIGS. 1 and 15, the plurality of DC power sources include multiple fuel cells 20, 90 and 120 respectively. Still further, the plurality of DC power sources may include a fuel cell 20 and having discrete modular portions 22, and wherein the portions may be removed while the remaining portions continue to operate and supply power to the load 14. Yet further, the plurality of DC power sources 11 may include multiple fuel cells 90 and 120, at least one of which is a fuel cell stack, and at least one of which has discrete modular portions 20. In the present invention, the multiple DC power sources 11 may include multiple fuel cell stacks as seen at numeral 120. Yet further, the plurality of DC power sources may include at least one fuel cell stack 90 which has discrete portions 106 which may be selectively electrically bypassed while the remaining portions continue to produce electrical power. Each of the fuel cells as described herein may be physically bypassed while the remaining fuel cells continue to substantially serve the load. As seen at FIGS. 1 and 15, all of these various DC power sources 11 may work in combination, together, as provided for by the controller 170, in order to substantially serve the load 14. As noted with the earlier forms of the invention, the control electronics assembly 13 is coupled in voltage sensing relation relative to the plurality of DC power sources 11. It is further coupled in sensing relation relative to the electrical power requirement of the load 14. The control electronics assembly 13 upon sensing a change in the electrical power requirement of the load reconfigures the plurality of DC power sources 11 by selectively electrically coupling and or decoupling the individual DC power sources by way of the switch circuitry 182 and 201, for example, to the load to substantially serve the sensed power requirement of the load. Yet further, the control electronics assembly is coupled in sensing relation relative to the various DC power source 11 such that upon sensing a predetermined voltage condition of at least one of the plurality of DC power sources the control electronics assembly reconfigures the plurality of DC power sources by selectively electrically coupling or decoupling the respective power sources to serve the needs of the load.

Figure 16:
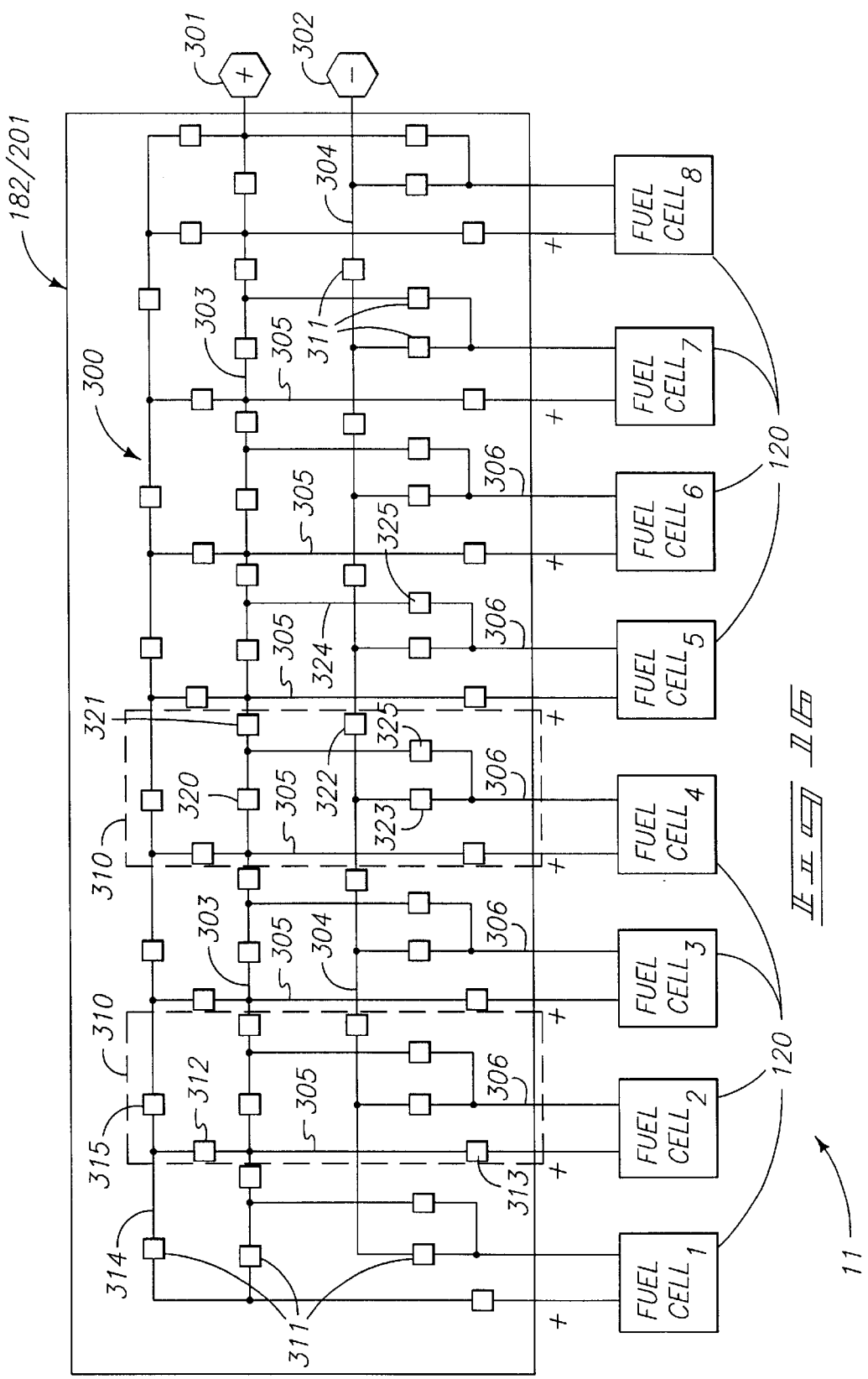
FIG. 16 is a sixth schematic diagram illustrating a switch matrix or array as used in the present invention.

Referring now to FIGS. 16–24, the switch circuitry 182 which may be employed with the present invention 10 is shown in further detail. As seen in FIG. 16, the switching circuitry, as earlier described, is operable to reconfigure the plurality of DC power sources 11. The DC power sources are illustrated as a plurality of fuel cells 120 (labeled 1–8) the switching circuitry provides various electrical arrangements such that the power output of the respective fuel cells can be combined together to provide a desired output for the load 14. As seen in FIG. 16 the switching circuitry 182 includes a switching matrix or array which is generally indicated by the numeral 300. The switching matrix or array is responsive to operator input 180 which may be provided by way of the controller 170, or further through commands received from the memory 200 of the control electronics assembly 13. The switching matrix 300 includes both a positive polarity terminal 301, and a negative polarity terminal 302, which is then coupled to an electrical pathway which provides power to the load 14. As will be seen in FIG. 16 the switching matrix 300 includes a first row line which is generally indicated by the numeral 303, and which is coupled to the positive polarity terminal 301; and a second row line 304, which is electrically coupled to the negative polarity terminal 302. Yet further, it will be seen from studying the switching matrix 300 that each fuel cell (1–8) is electrically coupled to the matrix 300 by way of a first column line 305, and a second column line which is generally designated by the numeral 306. As seen in FIG. 16, the switching matrix or array 300 is formed of repeating portions which are generally designated by the numeral 310, and which are enclosed within dotted lines. For purposes of simplicity, one of these portions 310 will be described. It will be understood that the switching array 300 has repeating portions 310 which correspond to each of the DC power sources 11 which are coupled to same. In this regard, and referring still to FIG. 16, the switching array 300 includes a plurality of electrical switches 311 which are responsive to the input of the operator 180, or further commands that are received by way of the controller 170 or control electronics assembly 13. As seen with respect to the repeating portions 310, first and second electrical switches 312 and 313 are positioned along the first column line 305 and are each individually located on the opposite sides of the first and second row lines 303 and 304 respectively. Still further, an electrical pathway 314 is provided, and which electrically couples the first column line 305 to an adjacent column line 305 in the next repeating portion 310. A third electrical switch 315 is positioned along the electrical pathway 314. Still further, fourth and fifth electrical switches designated by the numerals 320 and 321 respectively, are positioned along the first row line 303 in each of the portions 310. A sixth electrical switch 322 is positioned along the second row line for each portion 310. Further still, a seventh electrical switch 323 is positioned along the second column line 306. Finally, an electrical pathway 324 is provided which electrically couples with the second column line 306 at a location between the switch 323, and the DC power source 11, and which further is electrically coupled with the first row line 303. An electrical switch 325 is positioned along the electrical path 324 between the second column line and the first row line 303.

Referring now to FIG. 17 a rather simplistic schematic diagram is provided showing the switching matrix 300, and wherein the several DC power sources 11 (blocks labeled 1–8) are serially coupled together in order to provide a desired output for the load 14. The specific details of FIG. 17 are shown in FIG. 18 where the shaded switches 311 indicate closed electrical conditions for those particular switches, and the unshaded ones represent an open electrical condition. In order to achieve the serial electrical arrangement as seen in FIG. 17, it will be understood that electrical switches 313, 315, 321 and 325 are closed; and switches 312, 320, 322 and 323 are open.

Referring now to FIG. 19, the same switching matrix or array 300 is shown, and wherein the individual fuel cells 120 (labeled 1–8), and which comprise the plurality of DC power sources 11, are coupled in an electrically parallel fashion to the positive and negative terminals 301 and 302, respectively by way of the first and second row lines 303 and 304. More specific details of FIG. 19 is shown in FIG. 20, where it will be seen that for every portion 310, the switches 313; 320; 321; 322; and 323 are closed; and electrical switches 312; 315; and 325 are electrically open.

Referring now to FIG. 21 it will be seen that the switching matrix or array 300 can assume other configurations based upon the operational needs of the power system 10. For example, and referring to FIG. 21, an electrically parallel arrangement of several pairs of serially connected fuel cells 120 is shown. In both FIGS. 21 and 22 it should be understood that fuel cells 3 and 7 are presently out of service. These fuel cells could be out of service for any number of different reasons including failure of the respective fuel cells, or for maintenance, modification, or because the load is being adequately serviced by the other DC sources 11. As can be seen by reference to both Figures, fuel cells 1 and 2; 4 and 5; and 6 and 8 are serially coupled together. Further, each pair of serially coupled fuel cells are placed in parallel relationship with the remaining pairs of serially coupled fuel cells.

Referring now to FIGS. 23 and 24, a switching matrix 300 is illustrated where the individual fuel cells 120 (further labeled 1–8) are placed into both a serial arrangement, and a parallel arrangement. As seen from a study of FIG. 23 it should be understood that fuel cell 4 and 6 are presently out of service for the reasons earlier discussed. As seen in FIG. 23 fuel cells 1–5 are in serial electrical arrangement; and fuel cells 7 and 8 are in parallel relationship one to the other. Again, the switches which are shaded are switches which are electrically closed, and those switches that are unshaded are electrically open.

It will be seen therefore that the present power system provides a convenient means whereby a plurality of DC power sources 11 can be selectively electrically coupled together, electrically bypassed in the event of a failed fuel cell or component thereof, and thereafter electrically reconfigured to serve the power requirements of the load 14 in a manner not possible heretofore.

OPERATION

The operation of the described embodiments of the present invention are believed to be readily apparent and are briefly summarized at this point. A power system 10 for servicing the power requirements of the load 14 includes a plurality of DC power sources 11 having predetermined operational parameters, and which includes at least one fuel cell 90. Further, at least one of the DC power sources 11 may also include discreet portions 106 which may be operably bypassed while any remaining portions simultaneously continue operating. A control electronics assembly 13 is provided, and which is electrically coupled in voltage sensing and controlling relation relative to the respective DC power sources 11 or portions thereof, and which upon sensing a predetermined operational condition of the plurality of DC power sources or portions thereof, and/or a change in the power requirements of the load 14 selectively reconfigures the plurality of DC power sources 11 or portions thereof, to substantially serve the power requirements of the load. As earlier discussed the control electronics assembly 13 may selectively reconfigure the plurality of DC power sources based upon operational parameters which may indicate a decline in the performance of at least one of the DC power sources, or other conditions effecting the load 14. As earlier described, the switching circuitry 182 is provided and which may comprise a switching matrix 300 including a plurality of switches 311 which may be placed into various operational states thereby allowing the switching circuitry to add, subtract, or bypass a DC power source in a selective manner in order to provide the precise power requirements for the load.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A power system for supplying electrical power to a dynamic load which has a power requirement, comprising:
    a plurality of DC power sources which include at least one fuel cell, and wherein the individual DC power sources may be selectively physically and/or electrically by-passed while the remaining DC power sources continue to produce electrical power:
    a plurality of performance sensors which are individually mounted in performance sensing relation relative to the respective DC power sources, and wherein the respective DC power sources have performance indicia, and wherein the respective sensors are operable to sense and then produce an electrical signal which indicates the performance indicia of the respective DC power sources;
    control electronics circuitry including a controller which is electrically coupled to the respective DC power sources, and which senses the voltage output of the respective DC power sources, and is electrically arranged to sense the voltage and other requirements of the load, and wherein the control electronics circuitry is electrically coupled with the plurality of sensors, and is operable to receive the electrical signals generated by the respective sensors; and
    switching circuitry including a switching matrix electrically coupled with and responsive to the control electronics circuitry and the controller wherein the control electronics assembly, based upon the performance sensor electrical signals provided by the performance sensors and the voltage and other requirements of the load, electrically reconfigures the plurality of DC power sources by physically and/or electrically by-passing individual DC power sources, and further selectively electrically coupling the remaining DC power sources, by way of the switching circuitry, and the switching matrix, into serial, parallel, and/or serial and parallel electrical arrangements to provide a resulting DC power output which substantially meets the power requirements of the dynamic load.

2. A power system as claimed in claim 1, and wherein the control electronics reconfigures the plurality of D.C. power sources upon sensing electrical signals from one of the performance sensors which indicates a decline in the performance indicia of one of the D.C. power sources.

3. A power system as claimed in claim 1, and wherein the control electronics assembly, upon sensing electrical signals from one of the performance sensors which indicates a declining performance indicia of one of the D.C. power sources physically by-passes the D.C. power source having the declining performance indicia.

4. A power system as claimed in claim 1 and wherein the control electronics assembly, upon sensing electrical sensors from one of the performance sensors which indicates a declining performance indicia of one of the D.C. power sources electrically by-passes the D.C. power source having the declining performance indicia.

5. A power system as claimed in claim 1, and wherein the reconfiguration of the D.C. power sources further include physically and/or electrically by-passing all or a portion of one of the D.C. power sources.

6. A power system as claimed in claim 1 and wherein the reconfiguration of the D.C. power sources includes energizing and deenergizing selected D.C. power sources.

* * * * *